United States Patent
Nagatsu et al.

(10) Patent No.: US 11,604,330 B2
(45) Date of Patent: Mar. 14, 2023

(54) IMAGING APPARATUS WITH A ROTATABLE IMAGING ELEMENT AND CAPABLE OF FOCUS DETECTION WITH ROTATED IMAGING ELEMENT

(71) Applicant: CANON KABUSHIKI KAISHA, Tokyo (JP)

(72) Inventors: Sho Nagatsu, Kanagawa (JP); Haruhisa Ueda, Kanagawa (JP); Hitoshi Mizoguchi, Aichi (JP); Kazuaki Yamana, Kanagawa (JP); Jun Kamiya, Kanagawa (JP); Keisuke Fukuyo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 17/176,912

(22) Filed: Feb. 16, 2021

(65) Prior Publication Data

US 2021/0255421 A1    Aug. 19, 2021

(30) Foreign Application Priority Data

Feb. 17, 2020    (JP) .............................. JP2020-024111

(51) Int. Cl.
*G02B 7/28*      (2021.01)
*H04N 5/232*    (2006.01)
*G02B 27/64*    (2006.01)

(52) U.S. Cl.
CPC ........... *G02B 7/285* (2013.01); *G02B 27/646* (2013.01); *H04N 5/23264* (2013.01); *H04N 5/232122* (2018.08)

(58) Field of Classification Search
CPC ........ G02B 7/285; G02B 27/646; G02B 7/38; H04N 5/232122; H04N 5/23264
See application file for complete search history.

(56) References Cited

U.S. PATENT DOCUMENTS

| | | | | |
|---|---|---|---|---|
| 2008/0145042 | A1* | 6/2008 | Kawai | ................... H02N 2/028 396/55 |
| 2018/0288332 | A1* | 10/2018 | Nishitani | ................ H04N 5/232 |
| 2020/0026024 | A1* | 1/2020 | Asano | .................... G03B 17/14 |
| 2020/0358942 | A1* | 11/2020 | Kimura | ................ H04N 5/2327 |

FOREIGN PATENT DOCUMENTS

JP          5398140 B2      1/2014

* cited by examiner

*Primary Examiner* — Gevell V Selby
(74) *Attorney, Agent, or Firm* — Cowan, Liebowitz & Latman, P.C.

(57) ABSTRACT

An imaging apparatus includes an imaging element that captures an image for detecting a phase difference in a predetermined direction on an image surface in order to detect a focal state of an image formed by an image formation lens, an imaging element driving unit configured to be able to drive the imaging element in a parallel movement direction and a rotation direction within a plane perpendicular to an optical axis of the image formation lens, and a focus detection unit configured to detect a focus by rotating the imaging element using the imaging element driving unit in accordance with a result of an image captured by the imaging element.

21 Claims, 20 Drawing Sheets

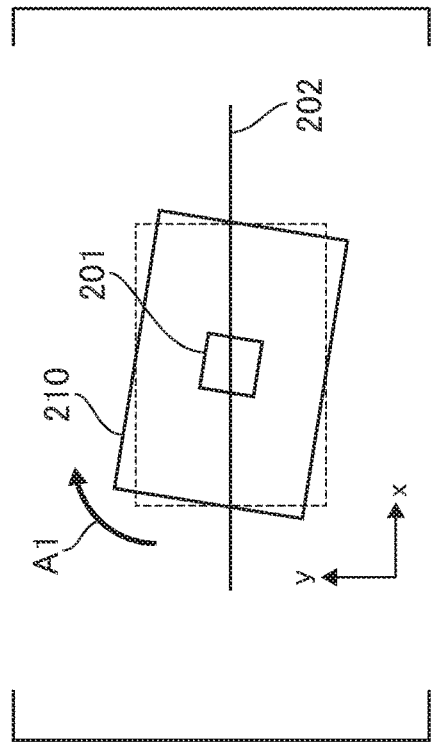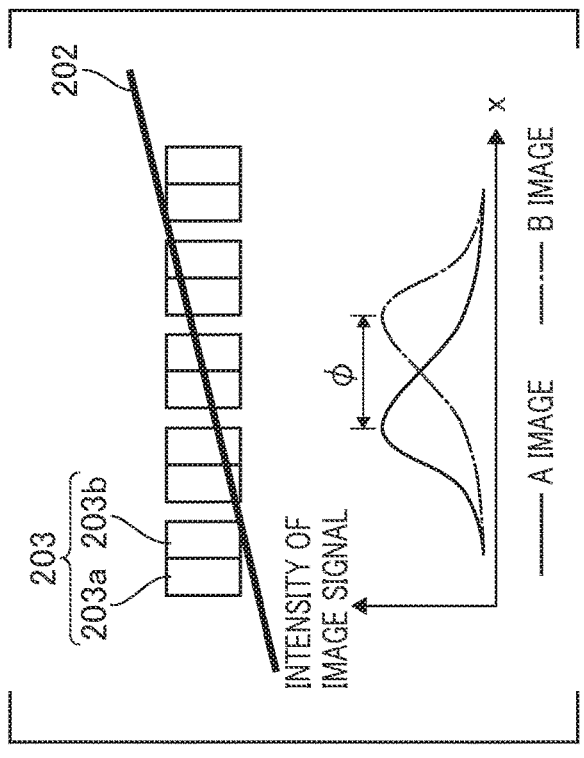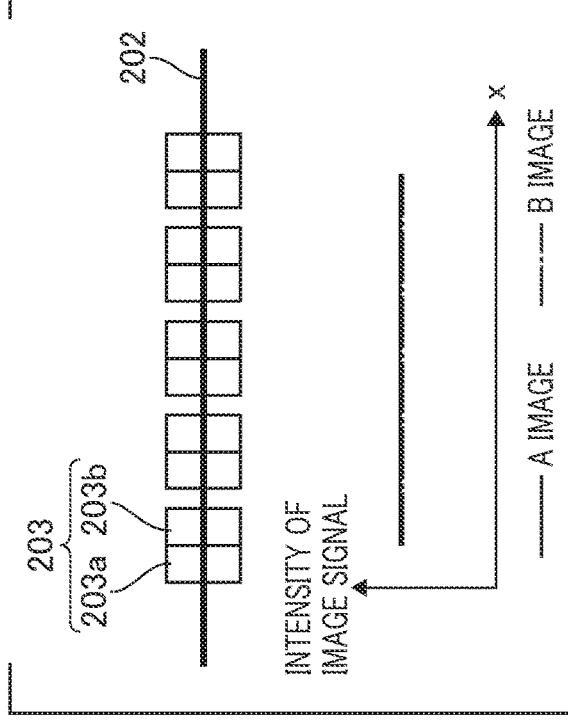

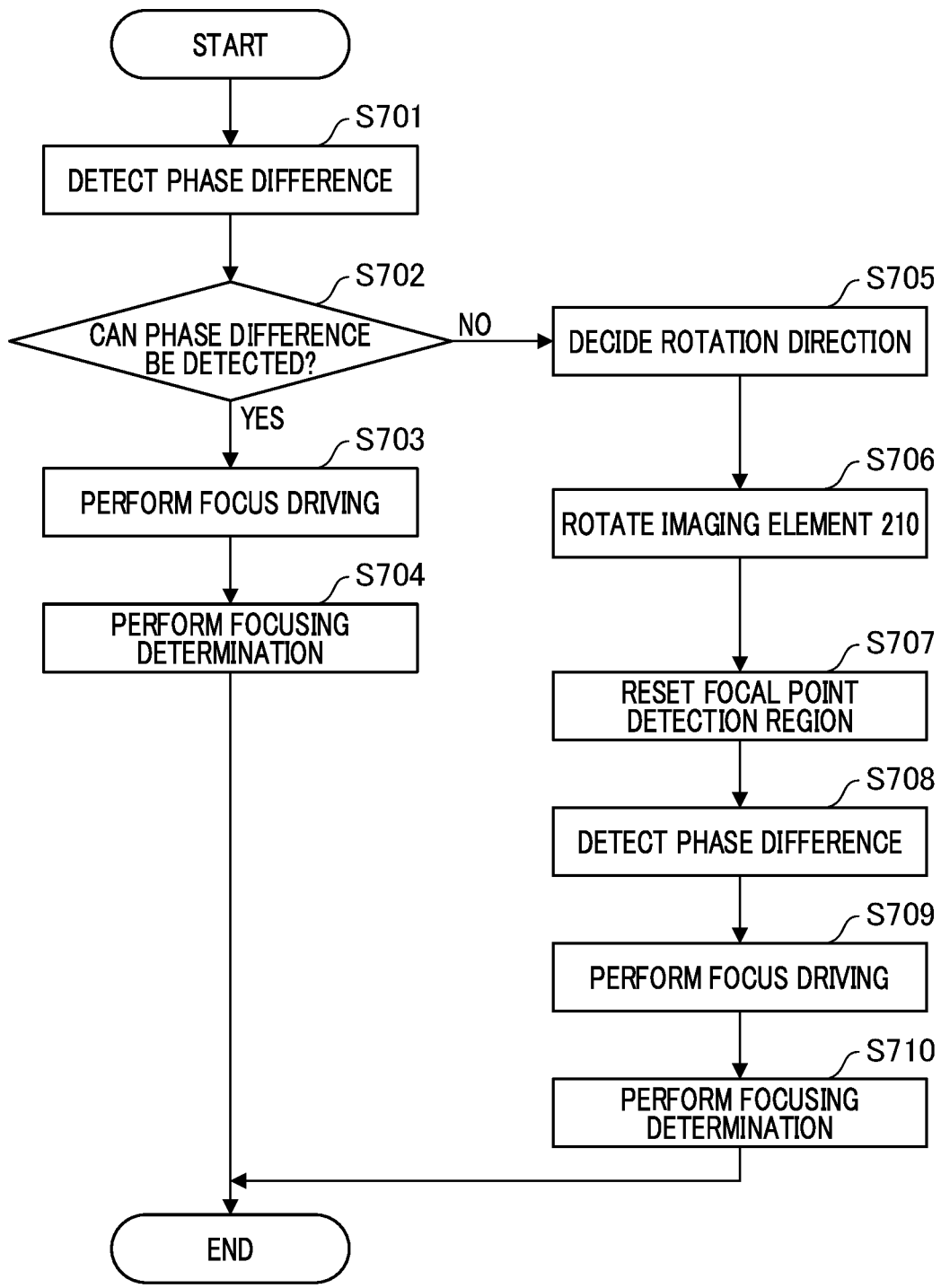

IMAGING APPARATUS WITH A ROTATABLE IMAGING ELEMENT AND CAPABLE OF FOCUS DETECTION WITH ROTATED IMAGING ELEMENT

BACKGROUND OF THE INVENTION

Field of the Invention

The present invention relates to an imaging apparatus.

Description of the Related Art

An imaging apparatus divides a pupil of an image capturing optical system into a plurality of regions, performs photoelectric conversion of a plurality of images formed by light from the plurality of regions using a light receiving sensor, and performs focus detection operation of obtaining a phase difference between the plurality of images. In addition, the imaging apparatus moves a focus lens on the basis of a focus detection result and achieves focusing. The imaging apparatus performs auto focusing (AF) in this manner.

In the related art, regarding AF of a phase difference detection method, secondary image formation phase difference AF using a secondary image formation optical system and an AF sensor or image surface phase difference AF using an imaging element is known. In the secondary image formation phase difference AF, the AF sensor is constituted of a vertical sensor in which images of subject images separated in a vertical direction are formed and a horizontal sensor in which images of subject images separated in a transverse direction are formed. Therefore, a focus for an subject having a lateral line pattern or a vertical line pattern can be detected.

In addition, in the related art, there is a technology for an image blur correction apparatus that optically corrects an image blur by displacing a movable portion in which an optical element is mounted. Further, there is a technology for improving AF accuracy by controlling driving of this image blur correction apparatus.

In the imaging apparatus disclosed in Japanese Patent No. 5398140, a movable range of an optical element in image blur correction mechanism is limited during AF operation. During AF operation, since displacement of the optical element is allowed within a smaller range than that during non-AF operation, occurrence of a focus detection error caused by a significant image blur on a light receiving sensor is curbed and AF accuracy is improved.

However, in the image surface phase difference AF, if pixels of an imaging element are constituted of a pixel group which are divided in only one direction, a focus of a lateral line pattern or a vertical line pattern may not be able to be detected depending on a division direction of the pixels. In an imaging element capable of performing ordinary image surface phase difference AF, since pixels are bisected in a transverse direction, it is difficult to detect a focus with respect to a lateral line at a normal position of the imaging apparatus. Further, in the technology in the related art disclosed in Japanese Patent No. 5398140 described above, a focus for a subject having a lateral line pattern cannot be detected in image surface phase difference AF of an imaging element in which pixels are divided in only one direction.

SUMMARY OF THE INVENTION

The present invention provides an imaging apparatus capable of detecting a focus even when a subject is a lateral line pattern.

According to an embodiment of the present invention, there is provided an imaging apparatus including an imaging element that captures an image for detecting a phase difference in a predetermined direction on an image surface in order to detect a focal state of an image formed by an image formation lens, an imaging element driving unit configured to be able to drive the imaging element in a parallel movement direction and a rotation direction within a plane perpendicular to an optical axis of the image formation lens, and a focus detection unit configured to detect a focus by rotating the imaging element using the imaging element driving unit in accordance with a result of an image captured by the imaging element.

Further features of the present invention will become apparent from the following description of exemplary embodiments with reference to the attached drawings.

BRIEF DESCRIPTION OF THE DRAWINGS

FIGS. 4A to 4C are views describing phase difference detection performed through rotation driving of the imaging element according to the first embodiment of the present invention.

FIG. 14 is a flowchart illustrating a flow of phase difference detection performed through rotation driving of the imaging element according to the fifth embodiment of the present invention.

DESCRIPTION OF THE EMBODIMENTS

First Embodiment

Hereinafter, an imaging apparatus according to a first embodiment of the present invention will be described with reference to FIGS. 1A and 1B.

Figure 1A:
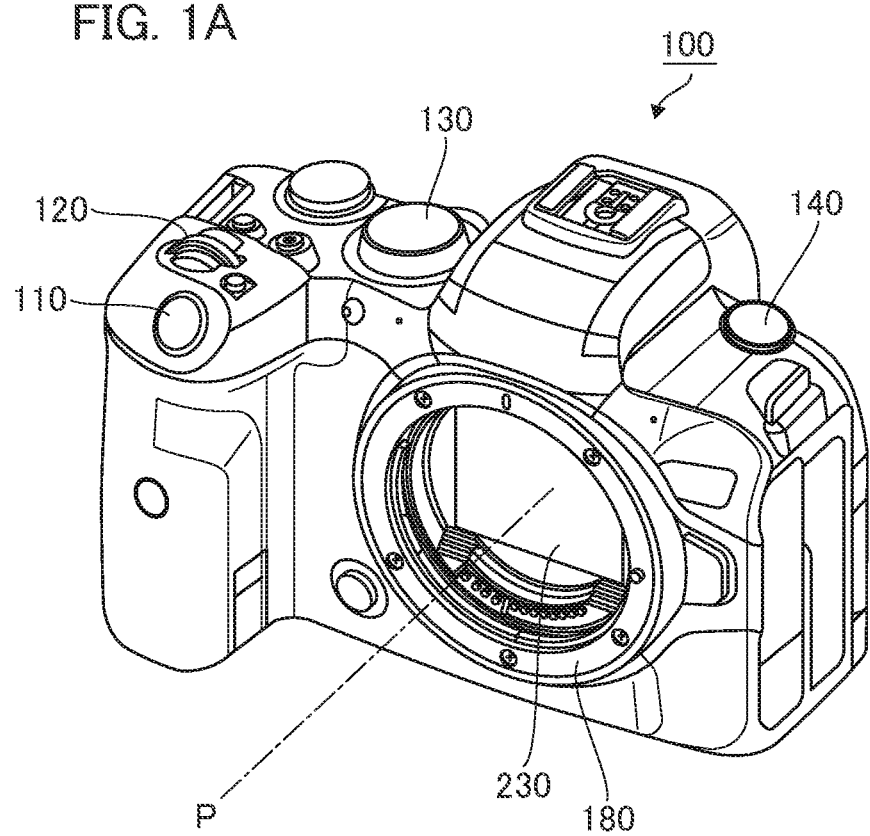
FIGS. 1A and 1B are perspective views of an appearance of an imaging apparatus according to a first embodiment of the present invention.
Figure 1B:
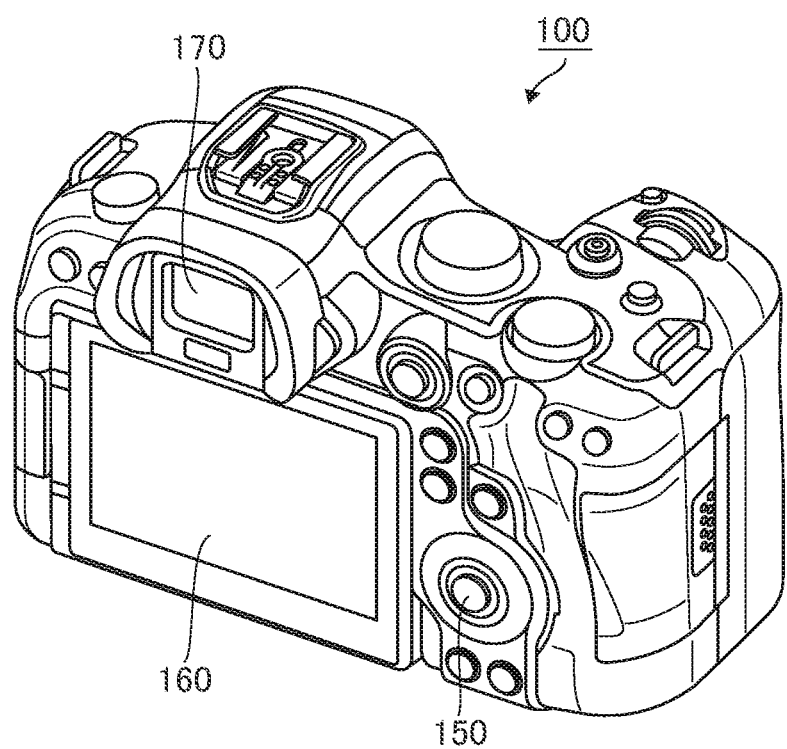

FIGS. 1A and 1B illustrate views of an appearance of an imaging apparatus 100 of the present invention.

FIG. 1A is a front perspective view of the imaging apparatus 100, and FIG. 1B is a rear perspective view of the imaging apparatus 100.

A shutter button 110 is an operation portion for performing an instruction for capturing an image.

A dial 120 is a rotation operation member which can rotate clockwise and counterclockwise without abutment, and various setting values such as a shutter speed and an aperture can be changed or the like by turning this dial 120.

A mode switching dial 130 is an operation portion for switching between various modes.

A power supply switch 140 is an operation member for switching between ON and OFF of a power supply of the imaging apparatus 100.

A setting button 150 is a push button and is mainly used for deciding a selection item or the like.

A display device 160 is a monitor using a TFT liquid-crystal display or organic EL and performs displaying of various setting screens or captured images of the imaging apparatus 100 and displaying of live view images. A TFT liquid-crystal display is an abbreviation for thin-film-transistor liquid-crystal display. Organic EL is an abbreviation for organic electro-luminescence.

An electrical view finder (EVF) 170 is an ocular finder and performs displaying of various setting screens or captured images of the imaging apparatus 100 and displaying of live view images.

A replacement lens (not illustrated) can be mounted in a mount 180. An axis passing through a center of the mount 180 substantially coincides with an image capturing optical axis P.

An imaging element 210 is an imaging sensor such as a CCD or a CMOS including an infrared cut filter, a low pass filter, or the like, and an image of a subject is formed by a replacement lens (not illustrated) at the time of capturing an image.

The imaging element 210 is an example of an imaging element capturing an image for detecting a phase difference in a predetermined direction on an image surface to detect a focal state of an image formed by an image formation lens.

Figure 2:
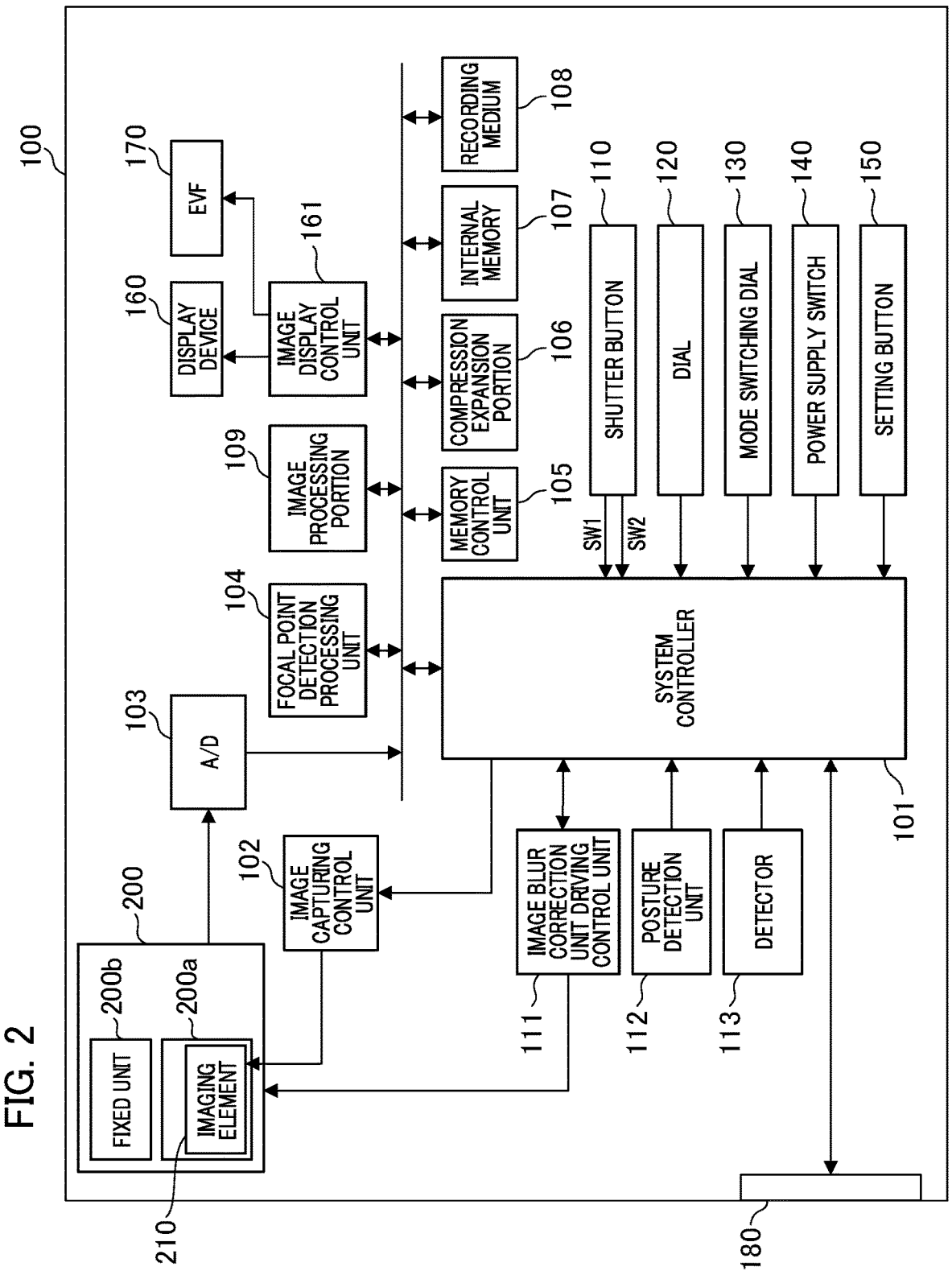
FIG. 2 is a block diagram illustrating a constitution of the imaging apparatus according to the first embodiment of the present invention.

FIG. 2 is a block diagram illustrating a constitution of the imaging apparatus in FIGS. 1A and 1B. The imaging apparatus 100 has each of the constituents illustrated in FIG. 2. As described in detail in FIG. 2, an image blur correction unit 200 has a movable unit 200a and a fixed unit 200b. In addition, the movable unit 200a includes the imaging element 210. The imaging element 210 is integrally formed in the movable unit 200a.

The image blur correction unit 200 is an example of an imaging element driving unit configured to be able to drive the imaging element in a parallel movement direction and a rotation direction within a plane perpendicular to an optical axis of the image formation lens.

The imaging element 210 converts an optical image of a subject incident thereon via an image capturing optical system (not illustrated) into an electrical signal and outputs the electrical signal, and a driving timing and the like are controlled by an image capturing control unit 102.

An A/D converter 103 converts an analog signal output from the imaging element 210 into a digital signal. A converted digital signal is stored in an internal memory 107 through control of a memory control unit 105 and a system controller 101.

An image processing portion 109 performs predetermined pixel interpolation processing or color conversion processing with respect to data from the A/D converter 103 or data from the memory control unit 105.

A focus detection processing unit 104 performs combining by adding a signal from a division pixel portion, detects a phase difference through correlation computation, and outputs a defocus amount. The focus detection processing unit 104 and the system controller 101 are examples of a focus detection unit configured to detect a focus with the imaging element rotated by the imaging element driving unit in accordance with a result of an image captured by the imaging element.

The memory control unit 105 controls the A/D converter 103, the image processing portion 109, a compression expansion portion 106, and the internal memory 107 and also controls recording of data in a recording medium 108.

Image data for displaying or a live view image written in the internal memory 107 is displayed by the display device 160 and/or the EVF 170 via an image display control unit 161. The image display control unit 161 can also perform crop processing cutting out a part of a live view image.

The display device 160 and/or the EVF 170 are examples of a display portion displaying an image subjected to predetermined image processing by an image processing unit during rotation driving of the imaging element in accordance with a result of an image captured by the imaging element.

The image display control unit 161 is an example of a display unit configured to cause the display portion to display an image subjected to predetermined image processing by the image processing unit during rotation driving of the imaging element in accordance with a result of an image captured by the imaging element.

The display device 160 and/or the EVF 170 are examples of a display device performing displaying corresponding to a focus detection region.

In addition, the internal memory 107 is used for storing captured still images or video images and can also be used as a working region for the system controller 101. The imaging apparatus 100 has a first mode for capturing a still image and a second mode for recording a video image.

The compression expansion portion 106 performing compression and expansion of image data reads an image stored in the internal memory 107 and performs compression processing or expansion processing, and data after processing is written in the internal memory 107 again.

The system controller 101 controls the imaging apparatus 100 in its entirety. The system controller 101 receives various operation instructions input from the shutter button 110, the dial 120, the mode switching dial 130, the power supply switch 140, the setting button 150, and the like. In addition, the system controller 101 communicates with a lens control circuit inside a replacement lens (not illustrated) via the mount 180.

A posture detection unit 112 is constituted of an angular speed sensor or an acceleration sensor and outputs posture information of the imaging apparatus 100 to the system controller 101. Further, the posture information is output to image blur correction unit driving control unit 111, and when the movable unit 200a of the image blur correction unit 200 is driven, shaking correction can be performed (first posture). In addition, the image blur correction unit driving control unit Ill can also monitor a position or a rotation angle of the imaging element 210. For example, this monitoring can be realized by mounting a Hall IC in the movable unit 200a, mounting a magnet in the fixed unit 200b, and detecting change in magnetic force using the Hall IC. The image blur correction unit driving control unit 111 is an example of a control unit configured to control driving of the imaging element driving unit in accordance with a result of an image captured by the imaging element. The posture detection unit 112 is an example of a posture detection unit.

If it is judged that a phase difference cannot be detected in the focus detection processing unit 104, the system controller 101 brings the imaging element 210 into a rotated state (second posture) by driving the image blur correction unit 200 via the image blur correction unit driving control unit 111. The system controller 101 detects a phase difference again in the focus detection processing unit 104 in a state of this second posture.

A detector 113 detects a brightness, a contrast, and a pattern within a focus detection region 201 (which will be described below with FIG. 4) at the time of detecting a phase difference and outputs these to the system controller 101. The detector 113 is an example of a brightness detection unit configured to detect a brightness within the focus detection region. The detector 113 is an example of a contrast detection unit configured to detect a contrast of a subject within the focus detection region. The detector 113 is an example of a pattern detection unit configured to detect a pattern of a subject within the focus detection region.

The image blur correction unit 200 is constituted of the movable unit 200a having the imaging element 210 and a coil, and the fixed unit 200b having a magnet. The movable unit 200a performs parallel movement or rotation movement within a plane orthogonal to the image capturing optical axis P due to a Lorentz force generated by electrifying the coil facing the magnet. However, this is a known technology, and thus detailed description thereof will be omitted.

Figure 3B:
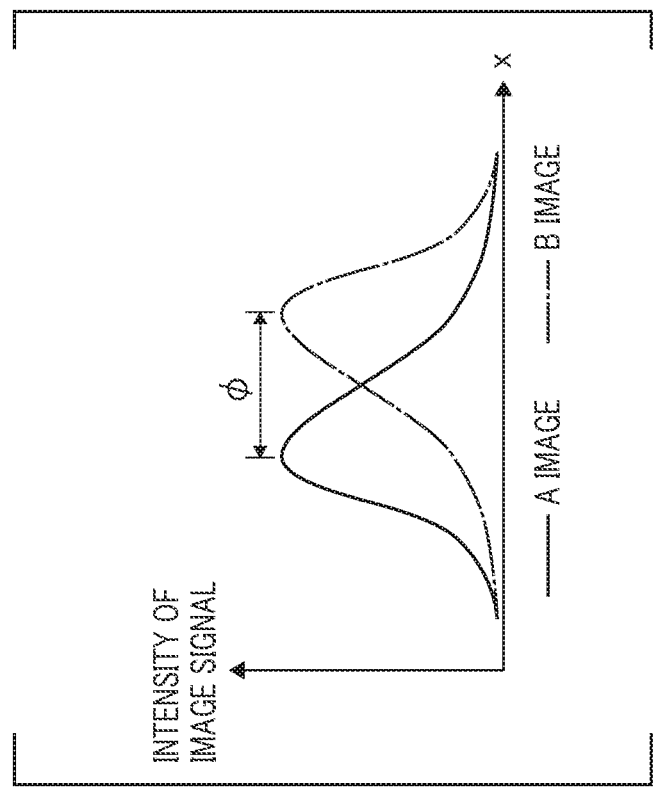
FIGS. 3A and 3B are views describing phase difference detection using division pixels of an imaging element according to the first embodiment of the present invention.

Next, using FIGS. 3A and 3B, image surface phase difference AF will be described.

Figure 3A:
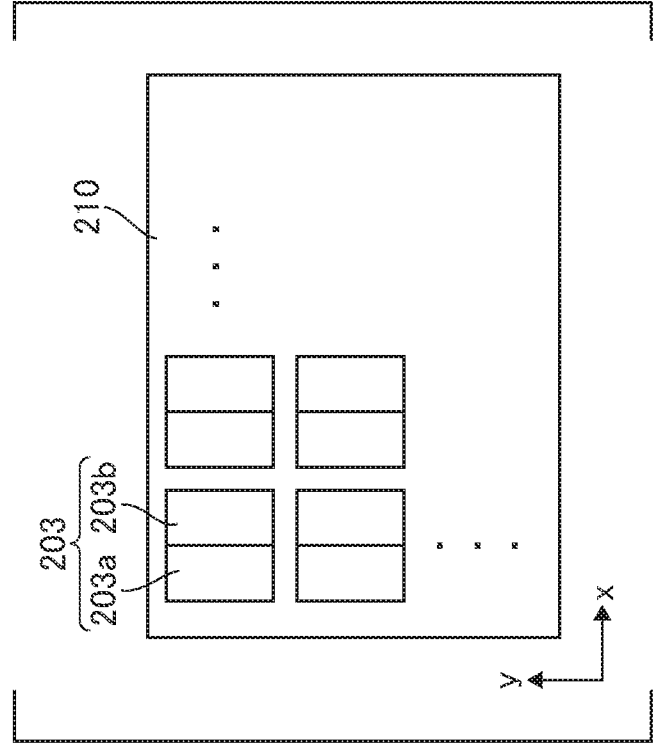

As illustrated in FIG. 3A, the imaging element 210 is constituted of a plurality of pixels 203 arranged in a two-dimensional matrix state. Each of the pixels 203 is constituted of an on-chip microlens (not illustrated) and an A image pixel 203a and a B image pixel 203b adjacent to each other in a transverse direction. A signal captured by a group of the A image pixels 203a is an A image, and a signal captured by a group of the B image pixel 203b is a B image. The imaging apparatus 100 detects relative positions of the A image and the B image. This is phase difference detection. As illustrated in FIG. 3B, the imaging apparatus 100 calculates the defocus amount and the direction thereof from a phase difference φ between the relative positions of the A image and the B image, and focusing is realized by driving the image capturing optical system such that the A image and the B image are most accurately superimposed. The A image pixel 203a and the B image pixel 203b are examples of a phase difference detection pixel.

Next, using FIGS. 4A, 4B, and 4C, phase difference detection performed through rotation driving of the imaging element 210 will be described. FIG. 4A is a view illustrating rotation driving of the imaging element 210. FIG. 4B is a view illustrating phase difference detection before rotation driving in FIG. 4A is performed. FIG. 4C is a view illustrating phase difference detection after rotation driving in FIG. 4A is performed.

In FIG. 4A, the dotted line part indicates a position before the imaging element 210 is driven, and the solid line part indicates a position after the imaging element 210 is driven. The imaging element 210 has a focus detectable region constituted of a plurality of pixels, and a part of the focus detectable region is selected by a user as the focus detection region 201. A flow of rotation driving of the imaging element 210 will be described below with FIG. 6. If a phase difference cannot be detected when a focus is detected with respect to a subject 202 of a lateral line pattern, the imaging apparatus 100 performs rotation driving of the imaging element 210 in an A1 direction around the focus detection region 201. At this time, a rotation center may be set anywhere as long as it is within a range of the focus detection region 201. In addition, the rotation direction is not limited to the A1 direction in the diagram and may be a direction opposite thereto.

FIG. 4B illustrates some of the pixels 203 arranged in the imaging element 210. The pixel 203 is divided into the A image pixel 203a and the B image pixel 203b. When the imaging element 210 is in a state of the dotted line part in FIG. 4A, an arrangement of the A image pixels 203a and the B image pixels 203b is substantially parallel to the subject 202 of the lateral line pattern. For this reason, there is no difference between outputs of the A image that is an image signal captured by the group of the A image pixels 203a and the B image that is an image signal captured by the group of the B image pixels 203b, and thus the imaging apparatus 100 cannot detect a phase difference.

FIG. 4C illustrates some of the pixels 203 when the imaging element 210 is in a state of the solid line part in FIG. 4A. At this time, an arrangement of the A image pixels 203a and the B image pixels 203b slants with respect to the subject 202, and thus the imaging apparatus 100 can detect the phase difference e from the A image and the B image which have been obtained. Therefore, the imaging apparatus 100 detects the defocus amount and the direction thereof from the phase difference q, and focusing can be realized in the subject 202. In order to detect the phase difference e, it is favorable that the imaging apparatus 100 be subjected to rotation driving such that the imaging element 210 slants by three degrees or greater with respect to the subject 202 of a lateral line pattern. In addition, if the imaging element 210 is subjected to rotation driving in order to detect a phase difference in this manner, the imaging apparatus 100 corrects an image blur using the image blur correction unit 200 in only the parallel movement direction within a plane orthogonal to the image capturing optical axis P and does not correct an image blur in the rotation direction. Accordingly, the imaging apparatus 100 can accurately detect a phase difference.

Figure 5A:
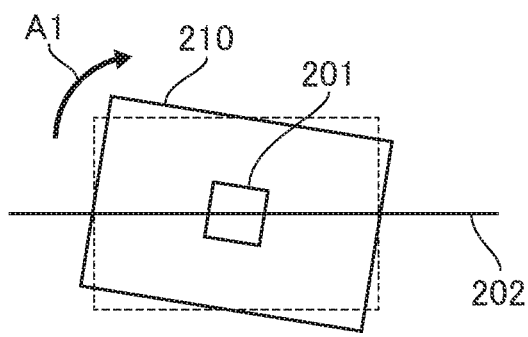
FIGS. 5A and 5B are views describing phase difference detection performed through rotation driving of the imaging element according to the first embodiment of the present invention in a first direction and a second direction.
Figure 5B:
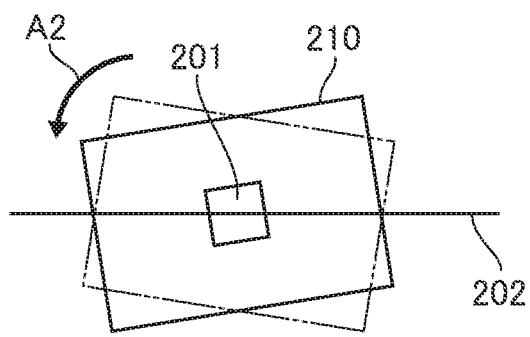

Next, using FIGS. 5A and 5B, phase difference detection performed through rotation driving in a first direction and a second direction of the imaging element 210 will be described. FIG. 5A is a view illustrating rotation driving of the imaging element 210 in the first direction (A1 direction). FIG. 5B is a view illustrating rotation driving of the imaging element 210 in the second direction (A2 direction).

FIG. 5A is rotation driving illustrated in FIG. 4A, and the imaging apparatus 100 detects a phase difference by performing rotation driving of the imaging element 210 in the A1 direction that is the first direction (2-1th posture). The 2-1th posture is an example of a second posture.

The two-dot dashed line part illustrated in FIG. 5B is a position before the imaging element 210 is driven, and the solid line part illustrated in FIG. 5B is a position after driving. The state indicated by the two-dot dashed line part in FIG. 5B corresponds to the state after driving in FIG. 5A. The imaging apparatus 100 detects a phase difference in a state indicated by the solid line in FIG. 5A, and if a phase difference cannot be detected, a phase difference is detected by performing rotation driving of the imaging element 210 in the A2 direction that is the second direction (2-2th posture). The 2-2th posture is an example of the second posture. Accordingly, since a phase difference can be detected in two directions with respect to the subject 202 of a lateral line pattern, focus detection such as so-called cross ranging can be performed. Also in rotation driving in the A2 direction, similar to rotation driving in the A1 direction, in order to detect the phase difference φ, it is favorable that the imaging apparatus 100 perform rotation driving such that the imaging element 210 slants by three degrees or greater with respect to the subject 202 of a lateral line pattern. Rotation driving in the A2 direction may be performed to a greater degree than rotation driving in the A1 direction.

Figure 6:
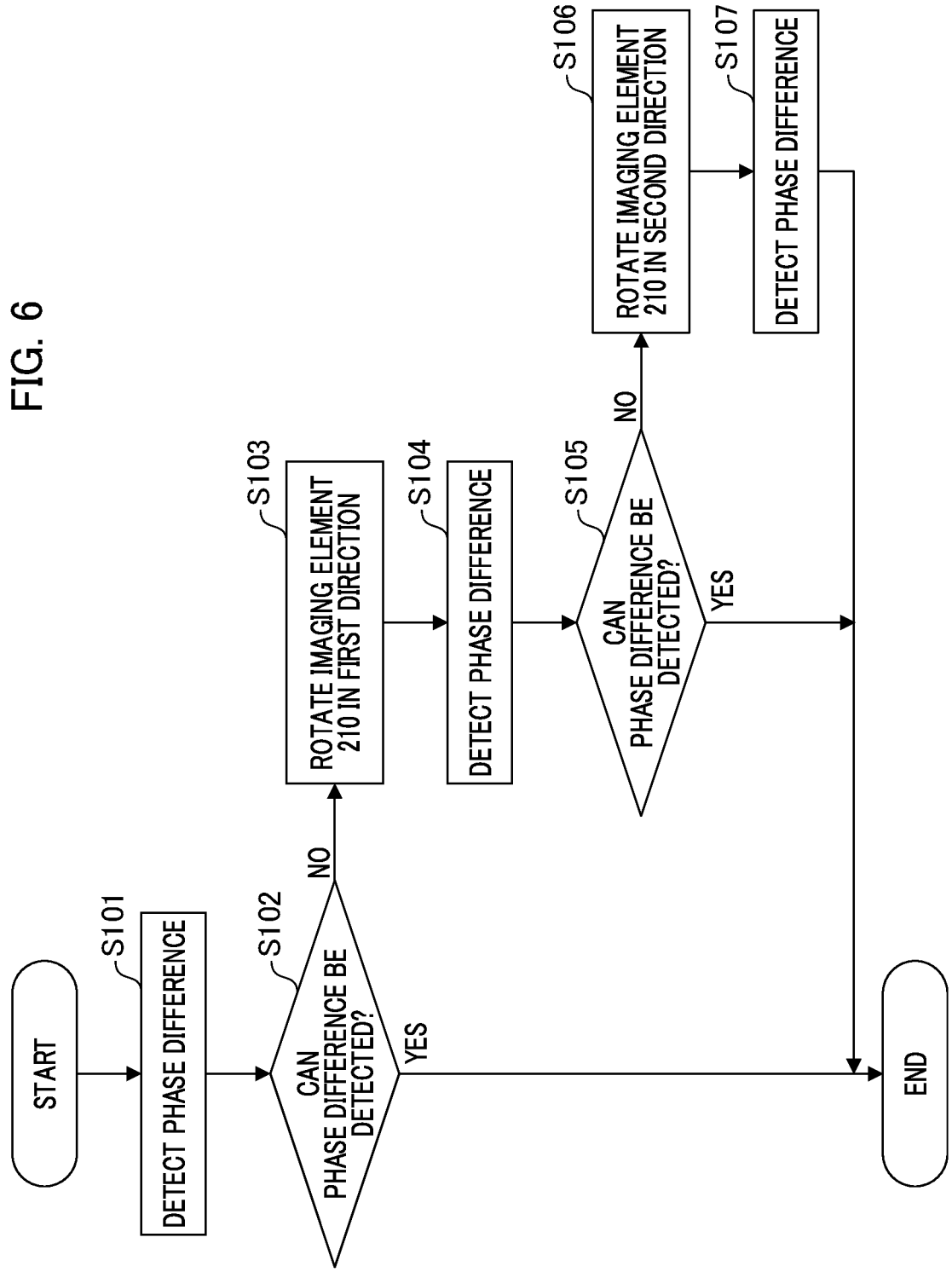
FIG. 6 is a flowchart illustrating a flow of phase difference detection performed through rotation driving of the imaging element according to the first embodiment of the present invention.

Using the flowchart in FIG. 6, a flow of phase difference detection performed through rotation driving of the imaging element 210 will be described.

When phase difference detection starts in the first posture (Step S101), if a phase difference can be detected (Yes in Step S102), the imaging apparatus 100 ends the processing related to phase difference detection. On the other hand, if a phase difference cannot be detected (No in Step S102), the imaging apparatus 100 performs rotation driving of the imaging element 210 in the first direction (Step S103) and detects a phase difference in the 2-1th posture (Step S104). At this time, if a phase difference can be detected (Yes in S105), the imaging apparatus 100 ends the processing related to phase difference detection. On the other hand, if a phase difference cannot be detected (No in Step S105), the imaging apparatus 100 performs rotation driving of the imaging element 210 in the second direction (Step S106) and detects a phase difference in the 2-2th posture (Step S107), and then the processing related to phase difference detection ends.

Whether a phase difference can be detected is an example of phase difference detection information. The phase difference detection information is an example of a result of capturing an image by the imaging element.

Second Embodiment

Next, the imaging apparatus according to a second embodiment of the present invention will be described. The block diagram of the imaging apparatus of the second embodiment is similar to that in FIG. 2, and thus description will be given with reference to FIG. 2.

In the imaging apparatus 100 described in the first embodiment, if a phase difference cannot be detected, a phase difference can be detected by rotating the imaging element 210.

However, if a phase difference cannot be detected because the brightness, the contrast, or the like does not satisfy a condition for being able to detect a phase difference, the imaging apparatus 100 cannot detect a phase difference even when the imaging element 210 is rotated.

In addition, it is possible to consider a case in which a phase difference cannot be detected because, as in the first embodiment, the imaging element 210 is in the state of the dotted line part in FIG. 4A and an arrangement of the A image pixels 203*a* and the B image pixels 203*b* is not substantially parallel to the subject 202 of a lateral line pattern. In this case, the imaging apparatus 100 cannot detect a phase difference even when the imaging element 210 is rotated.

That is, in this case, there is a probability that the imaging apparatus 100 may wastefully consume power or cause discomfort to a user by wastefully rotating the imaging element 210.

Figure 7:
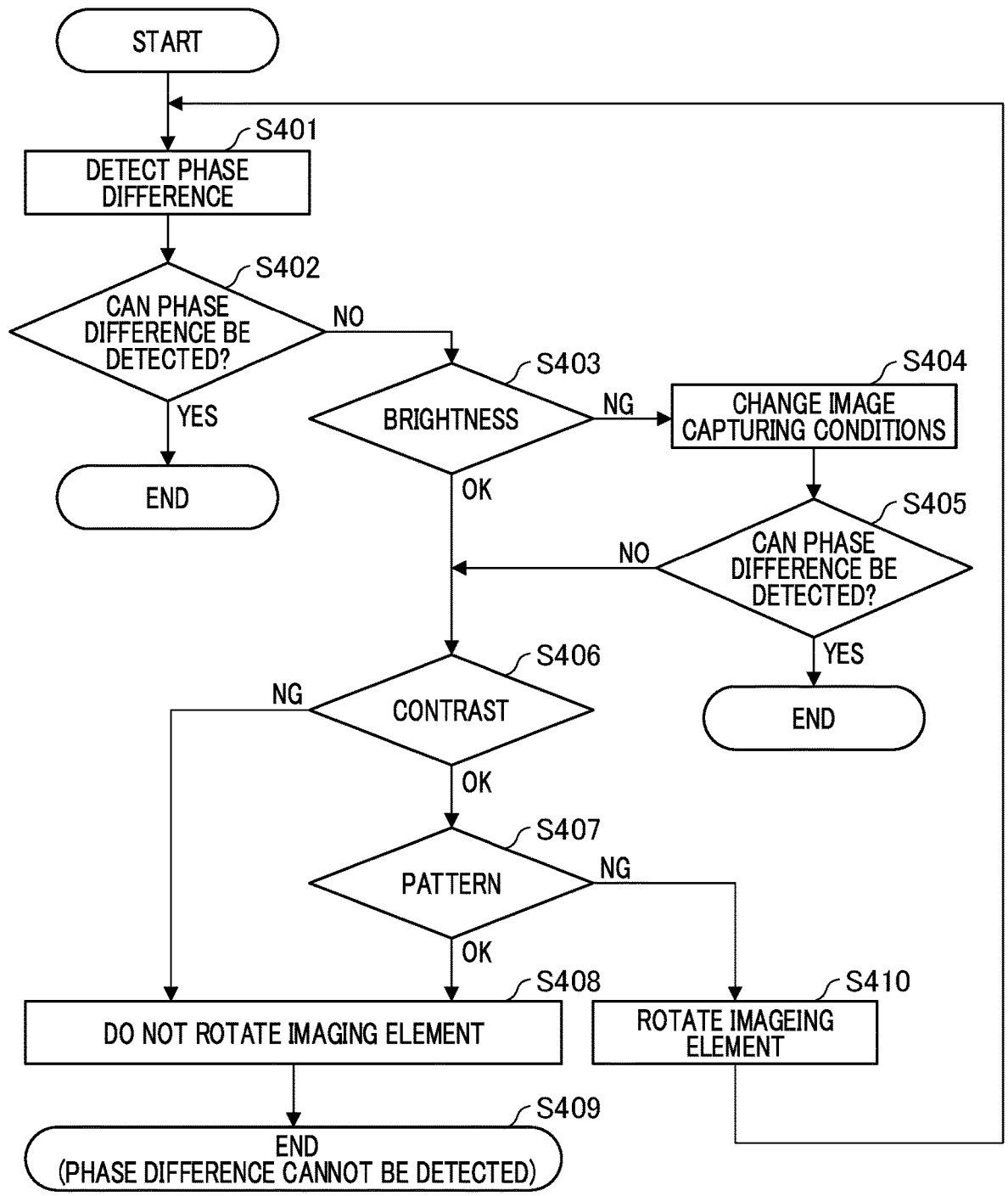
FIG. 7 is a flowchart for describing a second embodiment of the present invention.

FIG. 7 is a flowchart for determining whether or not the imaging element 210 is rotated at the time of detecting a phase difference.

When phase difference detection starts (Step S401), if a phase difference can be detected (YES in Step S402), the imaging apparatus 100 of the second embodiment ends the processing related to phase difference detection. On the other hand, if a phase difference cannot be detected (No in Step S402), the imaging apparatus 100 proceeds to the processing of Step S403.

In Step S403, the imaging apparatus 100 detects a brightness within the focus detection region 201 (refer to FIGS. 5A and 5B) using the detector 113 (refer to FIG. 2). If the detected brightness is a brightness suitable for detecting a phase difference (OK), the imaging apparatus 100 proceeds to the processing of Step S406. If the detected brightness is a brightness unsuitable for detecting a phase difference (NG), the imaging apparatus 100 proceeds to the processing of S404. A brightness suitable for detecting a phase difference may be set in advance through an experiment or the like.

In Step S404, the imaging apparatus 100 changes image capturing conditions at the time of detecting a phase difference such that the brightness detected in Step S403 becomes a brightness suitable for detecting a phase difference. Since adjustment of a brightness of a subject is known, detailed description thereof will be omitted. However, for example, if the brightness is excessively high (over), a method such as decreasing ISO sensitivity at the time of detecting a phase difference or increasing an aperture value of a lens (not illustrated) is considered. For example, if the brightness is excessively low (under), a method such as increasing ISO sensitivity at the time of detecting a phase difference, reducing an aperture value of a lens (not illustrated), or brightening the subject 202 using a light emitting device (not illustrated) or the like is considered.

In Step S404, when the brightness of the focus detection region 201 becomes a brightness suitable for detecting a phase difference, the imaging apparatus 100 proceeds to the processing of Step S405.

In Step S405, the imaging apparatus 100 determines phase difference detection in a manner similar to that in Step S402, and if a phase difference can be detected (YES in Step S405), the processing related to phase difference detection ends. On the other hand, if a phase difference cannot be detected (No in Step S405), the imaging apparatus 100 proceeds to the processing of Step S406.

In Step S406, the imaging apparatus 100 detects a contrast within the focus detection region 201 using the detector 113. If the detected contrast is a contrast suitable for detecting a phase difference (OK), the imaging apparatus 100 proceeds to the processing of Step S407. If the detected contrast is a contrast unsuitable for detecting a phase difference (NG), the imaging apparatus 100 proceeds to the processing of Step S408. A contrast suitable for detecting a phase difference may beset in advance through an experiment or the like.

Here, if it is determined that the contrast detected in Step S406 is not a contrast suitable for detecting a phase difference, there is no need for the imaging apparatus 100 to rotate the imaging element 210, and it is possible to determine that a phase difference cannot be detected.

In Step S407, the imaging apparatus 100 detects a pattern within the focus detection region 201 using the detector 113. Here, a pattern in description of the second embodiment is an angle formed by the subject 202 in which a phase difference has been detected with respect to an arrangement direction (horizontal axis on the sheet) of the A image pixels 203a and the B image pixels 203b in FIGS. 4B and 4C.

If the pattern detected is a pattern suitable for detecting a phase difference (OK), the imaging apparatus 100 proceeds to the processing of Step S408. If the pattern detected is a pattern unsuitable for detecting a phase difference (NG), the imaging apparatus 100 proceeds to the processing of Step S410.

Here, although the pattern detected in Step S407 is a pattern suitable for detecting a phase difference (OK), when a phase difference cannot be detected, there is no need for the imaging apparatus 100 to rotate the imaging element 210, and it is possible to determine that a phase difference cannot be detected.

In Step S408, it is judged that a phase difference cannot be detected even when the imaging element 210 is rotated, and the imaging apparatus 100 proceeds to the processing of Step S409.

In Step S409, the imaging apparatus 100 can determine that there is a need to select a method of detecting a phase difference again by changing the focus detection region 201, for example, other a method of rotating the imaging element 210 or the like.

In Step S410, the imaging apparatus 100 executes processing by rotating the imaging element 210 and returning to phase difference detection again (Step S401).

Hereinabove, according to the second embodiment, a phenomenon in which a phase difference cannot be detected even when the imaging element 210 is rotated can be curbed.

In addition, since the imaging element 210 is no longer wastefully rotated, it is possible to prevent consumption of wasteful power and to minimize discomfort to a user caused due to rotation of the imaging element 210.

Third Embodiment

Next, the imaging apparatus according to a third embodiment of the present invention will be described. The block diagram of the imaging apparatus of the third embodiment is similar to that in FIG. 2, and thus description will be given with reference to FIG. 2.

In the first embodiment, a method of enabling detection of a phase difference with respect to the subject 202 of a lateral line pattern by performing rotation driving of the imaging element 210 has been described. At this time, if a phase difference cannot be detected with the imaging element 210 rotated in the first direction, the imaging apparatus 100 continuously rotates the imaging element in the second direction to detect phase difference. That is, in order to enable phase difference detection, the imaging apparatus 100 needs to perform rotation driving of the imaging element 210 twice in the first direction and the second direction and requires a procedure to completion of phase difference detection. For this reason, in the present embodiment, a method of deciding a direction of rotation driving of the imaging element 210 and simplifying a procedure to phase difference detection will be described.

Figure 8:
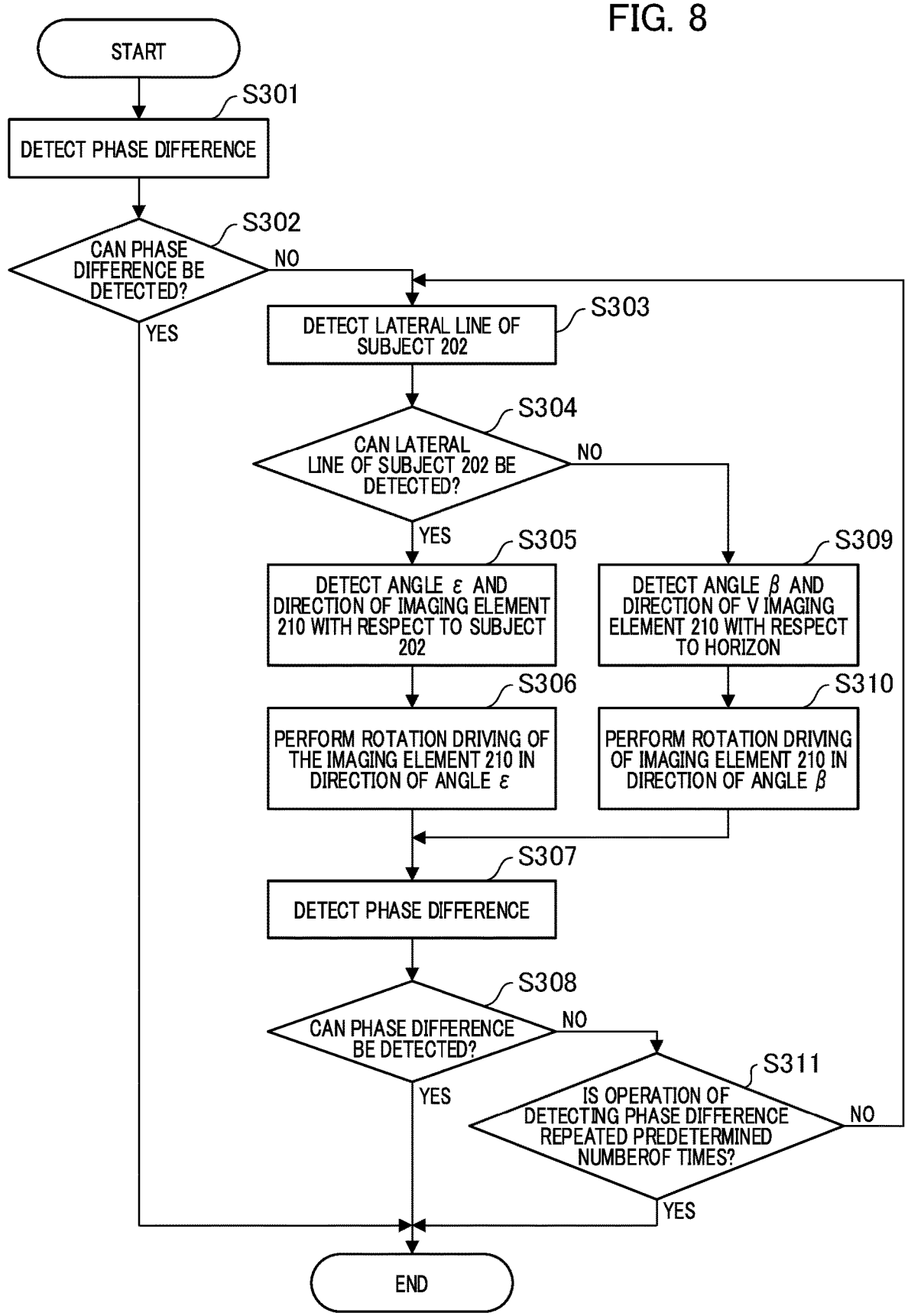
FIG. 8 is a flowchart illustrating a flow of phase difference detection according to a third embodiment of the present invention.
Figure 9A:
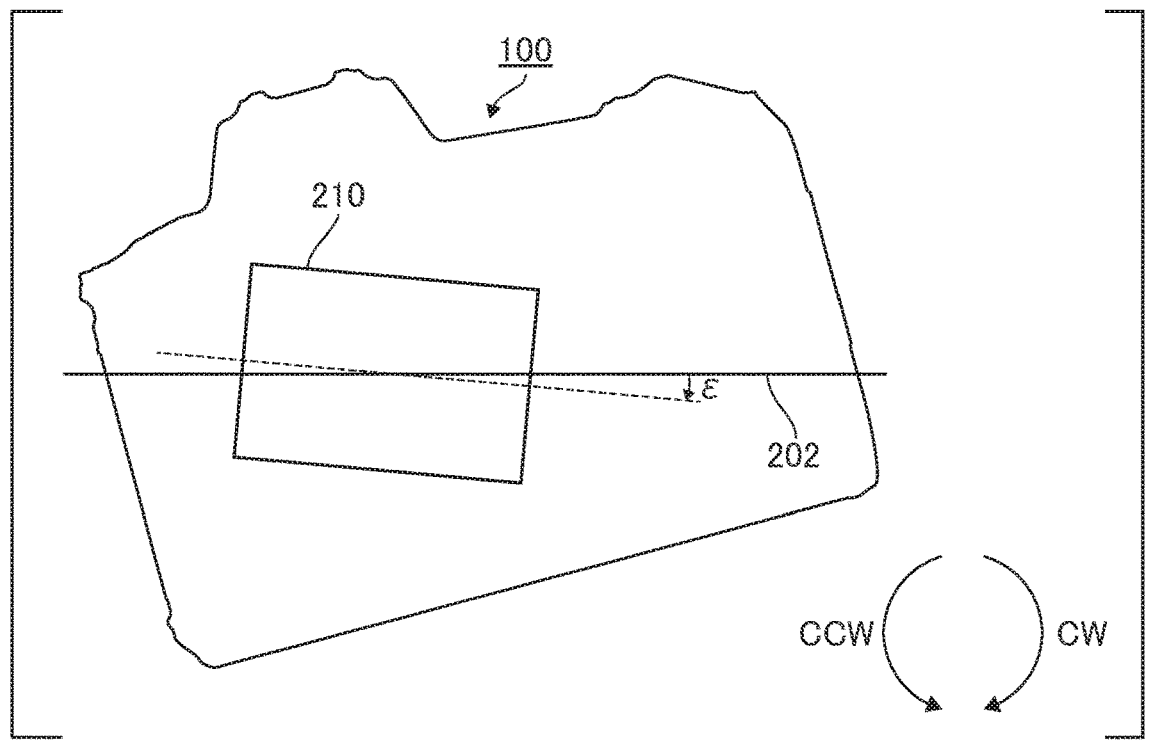
FIGS. 9A and 9B are views illustrating detection of a rotation driving amount and a direction according to the third embodiment of the present invention.
Figure 9B:
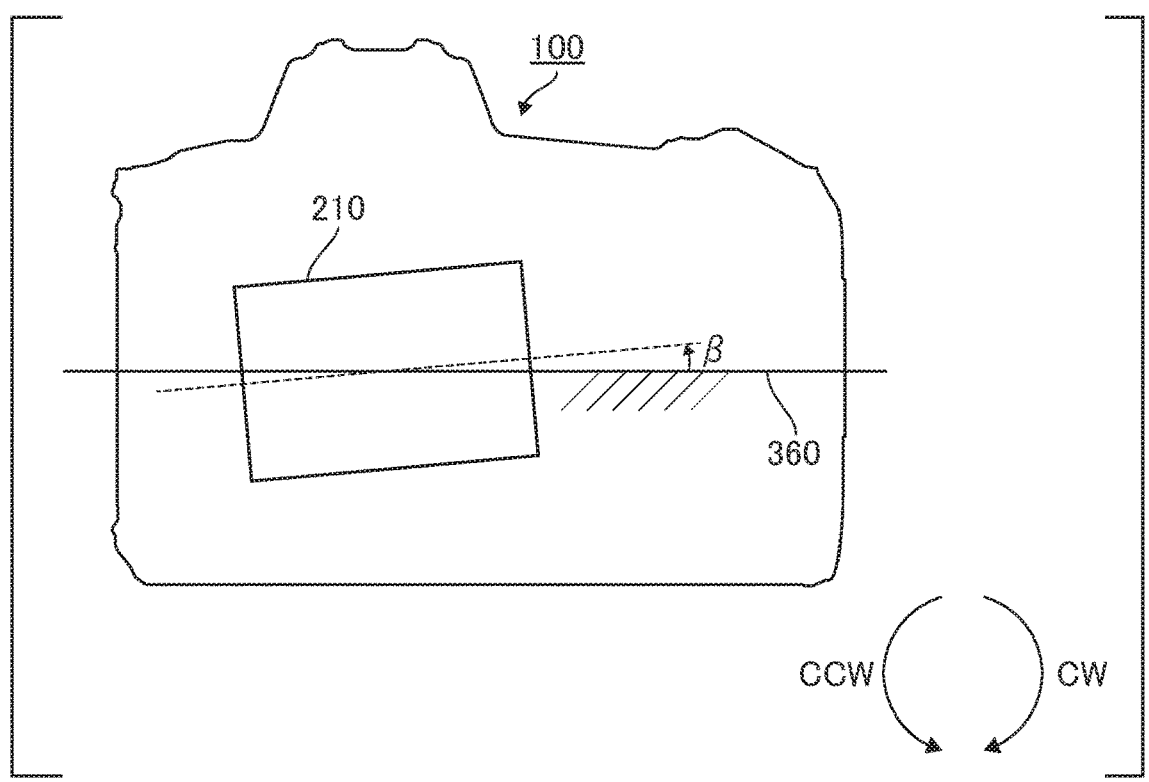

FIG. 8 is a flowchart illustrating a flow of phase difference detection performed through rotation driving of the imaging element 210 according to the present embodiment, and FIGS. 9A and 9B are views illustrating a state of detecting a rotation driving amount and a direction of the imaging element 210 in the flow of FIG. 8.

When phase difference detection starts (Step S301), if a phase difference can be detected (Yes in Step S302), the imaging apparatus 100 ends the processing related to phase difference detection. On the other hand, if a phase difference cannot be detected (No in Step S302), the imaging apparatus 100 detects the lateral line of the subject 202. Regarding lateral line detection of the subject 202, a method such as obtaining a boundary line formed by a color or a contrast in an image through image recognition may be adopted. If the lateral line of the subject 202 can be detected (Yes in Step S304), the imaging apparatus 100 detects an angle ε and a direction (a clockwise direction or a counterclockwise direction) of the imaging element 210 with respect to the lateral line of the subject 202 (Step S305). The angle ε and the direction of the imaging element 210 can be detected through image recognition of the imaging element 210 as illustrated in the state of FIG. 9A.

When an angle necessary for the imaging element 210 to be able to detect a phase difference is three degrees or greater similar to that in the first embodiment, the imaging element 210 may rotate 3-ε degrees or greater in the direction of the angle ε. That is, in Step S304, if the lateral line can be detected, the imaging apparatus 100 can derive the minimum necessary rotation driving amount of 3-ε degrees for the imaging element 210 to be able to detect a phase difference. Subsequently, the imaging apparatus 100 performs rotation driving of the imaging element 210 by 3-ε degrees or greater in the direction of the angle ε for phase difference detection (Step S306). The imaging apparatus 100 detects a phase difference thereafter (Step S307), and if a phase difference can be detected (YES in Step S308), the processing related to phase difference detection ends.

Up to here, a method for phase difference detection in a case in which the lateral line of the subject 202 can be detected has been described. However, since the subject 202 is in a state of a low brightness or a low contrast, there is also a probability that the lateral line cannot be detected through image recognition. In this case, in the operation described above, since the imaging apparatus 100 cannot derive the angle ε of the imaging element 210 with respect to the lateral line of the subject 202 described above, a phase difference cannot be detected.

For this reason, if it is determined that the lateral line of the subject 202 cannot be detected (No in Step S304), the imaging apparatus 100 detects an angle β and the direction of the imaging element 210 with respect to a horizontal reference 360 as illustrated in the state of FIG. 9B (Step S309). Here, an angle with respect to the horizontal reference 360 is detected because there is a high probability that the lateral line of the subject 202 is a line, such as the horizontal line or the horizon, intersecting a direction of a gravitational force at a right angle.

The imaging apparatus 100 can obtain the horizontal reference 360 by detecting a gravitational acceleration direction using the posture detection unit 112 constituted of the acceleration sensor and computing a direction orthogonal thereto.

In addition, the imaging apparatus 100 can obtain the angle β of the imaging element 210 by monitoring the position of the imaging element 210 using the image blur correction unit driving control unit 111 and comparing it with the horizontal reference 360 described above.

When the angle β and the direction are obtained, on the assumption that the rotation driving amount necessary for phase difference detection of the imaging element 210 is 3-0 degrees or greater, the imaging apparatus 100 performs rotation driving of the imaging element 210 by 3-0 degrees or greater (Step S310). Thereafter, the imaging apparatus 100 detects a phase difference (Step S307), and if a phase difference can be detected (YES in Step S308), the processing related to phase difference detection ends.

As described above, the imaging apparatus 100 can derive the rotation driving amount and the direction of the imaging element 210 for enabling phase difference detection by obtaining the angle ε with respect to the lateral line of the subject 202 of the imaging element 210 or the angle β with respect to the horizontal reference 360. As a result, the imaging apparatus 100 can detect a phase difference through one operation of rotation driving of the imaging element 210, and thus simplification of operation can be achieved.

On the other hand, there is also a probability that the imaging apparatus 100 may not be able to detect a phase difference even when the imaging element 210 is subjected to rotation driving due to the conditions such as a low brightness or a low contrast of the subject 202 (No in Step S308). If ε or β is detected in this state and operation of detecting a phase difference is not repeated a predetermined number of times (No in Step S311), the imaging apparatus 100 attempts to detect a phase difference by returning to Step S303 again and detecting ε or β. If ε or β is detected and operation of detecting a phase difference is repeated a predetermined number of times (YES in Step S311), the imaging apparatus 100 determines that it is a subject in which a phase difference cannot be detected through rotation driving of the imaging element 210 according to the present invention, and then the processing related to phase difference detection ends.

Fourth Embodiment

Next, the imaging apparatus according to a fourth embodiment of the present invention will be described. The block diagram of the imaging apparatus of the fourth embodiment is similar to that in FIG. 2, and thus description will be given with reference to FIG. 2.

In the imaging apparatus 100 described in the first embodiment, in order to perform rotation driving of the imaging element 210, a space for a region in which the movable unit 200a of the image blur correction unit 200 moves is required, and there is a probability that the imaging apparatus 100 may increase in size.

The image blur correction unit driving control unit 111 corrects an image blur by causing the movable unit 200a of the image blur correction unit 200 to perform parallel movement or rotation driving within a plane orthogonal to the image capturing optical axis P.

If a shaking amount is significant, the imaging apparatus 100 moves the imaging element 210 significantly in order to curb occurrence of an image blur caused by the significant shaking amount. However, a case in which there is no room for the size of an image circle of a lens mounted in the imaging apparatus 100 or a case in which the center of the image circle has shifted due to a manufacturing error or the like can be considered. In such a case, when the imaging apparatus 100 moves the imaging element 210 significantly, a sufficient amount of light may not be obtained in corner parts of the imaging element 210, and thus a captured image has darkened corner parts. For this reason, it is not possible to obtain a sufficient movement amount of the imaging element 210 for correcting an image blur.

Here, a technology in which center position information of the image circle of the lens (that is, the optical axis of the lens) is transmitted to the imaging apparatus 100 through communication and the imaging element 210 is shifted such that the center of the imaging element 210 and the optical axis of the lens coincide with each other has been proposed.

In addition, since center position information of the image circle varies in accordance with the state of the lens, such as a posture, a focal distance, a focal state, or an aperture of the imaging apparatus 100, a technology in which the imaging element 210 is shifted in consideration of this information has also been proposed.

On the other hand, when the imaging element 210 is subjected to rotation driving after the center of the imaging element 210 is moved, there is a high probability that a region in which the movable unit 200a of the image blur correction unit 200 moves may expand.

Figure 10A:
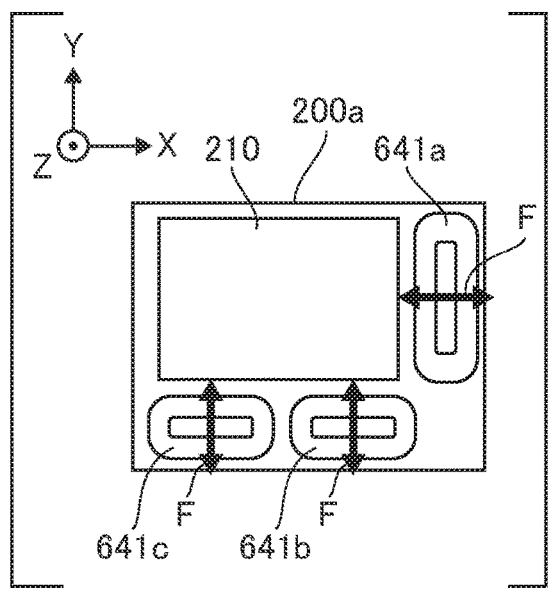
FIGS. 10A to 10C are schematic views illustrating a movement region of a movable unit according to a fourth embodiment of the present invention.
Figure 10B:
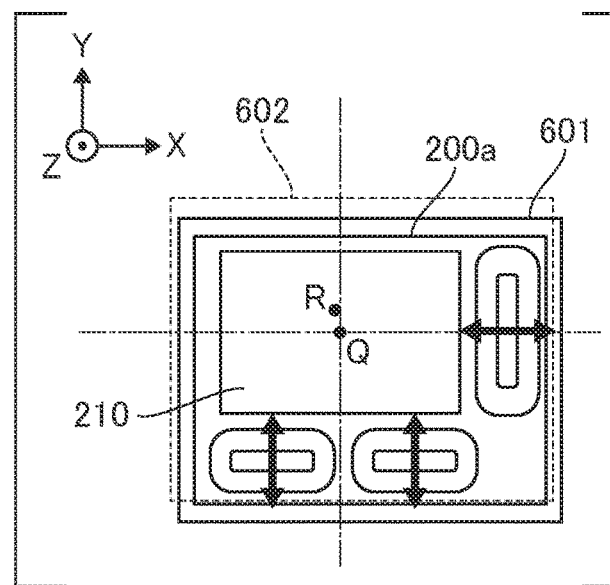
Figure 10C:
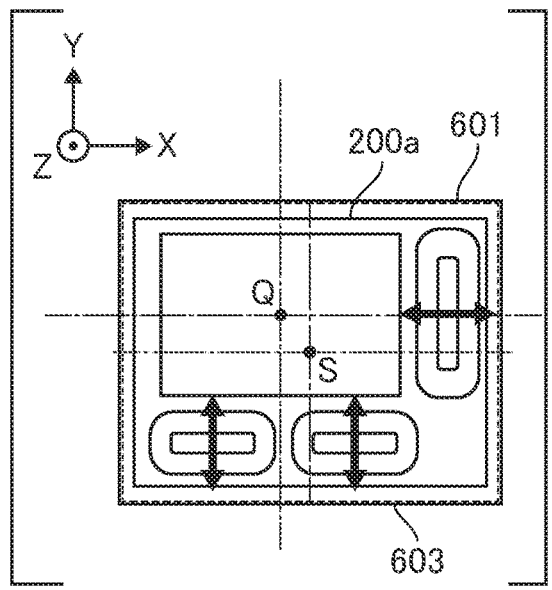

In addition, this region also varies depending on a place set for the rotation center. FIGS. 10A, 10B, and 10C are schematic views illustrating a movement region of the movable unit 200a.

FIG. 10A is a view illustrating constituent elements of the movable unit 200a.

In the movable unit 200a, the coils 641a, 641b, and 641c are disposed at positions facing a magnet portion (not illustrated) of the fixed unit 200b. The imaging apparatus 100 generates a Lorentz force F in the coils 641a, 641b, and 641c by applying a current to these coils 641a, 641b, and 641c. The imaging apparatus 100 has a constitution in which the movable unit 200a can be displaced in a flat surface direction orthogonal to the image capturing optical axis P due to the Lorentz force F used as a thrust force.

FIG. 10B is a view illustrating a movement region in a case in which the movable unit 200a is subjected to rotation driving w % ben the center of the imaging element 210 is moved.

A rectangular region 601 is a rectangular region provided to be able to include a movement region when the movable unit 200a is rotated clockwise and counterclockwise by five degrees using a center Q of the imaging element 210. That is, the movable unit 200a can perform rotation driving clockwise and counterclockwise by five degrees when a space is provided to allow parallel movement within the rectangular region 601.

A rectangular region 602 indicated by the dotted line in FIG. 10B is a rectangular region provided to be able to include a movement region when the movable unit 200a is rotated clockwise and counterclockwise by five degrees when the center of the imaging element 210 is moved from Q to R.

As illustrated in FIG. 10B, since the rectangular region 602 is not settled within the rectangular region 601, it can be seen that the movement region of the movable unit 200a expands by moving the center of the imaging element 210 from Q to R.

FIG. 10C is a view illustrating a rotation driving region of the movable unit 200a when the rotation center is changed.

A rectangular region 603 indicated by the dotted line in FIG. 10C is a rectangular region provided to be able to include a movement region when the movable unit 200a is rotated clockwise and counterclockwise by five degrees using a center S of the movable unit 200a.

As illustrated in FIG. 10C, since the rectangular region 603 is settled within the rectangular region 601, it can be seen that the movement region of the movable unit 200a can be reduced by setting the rotation center of the movable unit 200a from Q to S.

Basically, when the rotation center is at the center of the movable unit 200a, it is possible to say that there is a high probability that the movement region may be settled in the smallest turning trajectory and settled in a smaller space.

Here, an actual movable unit 200a is not limited to having a simple rectangular shape as illustrated in FIGS. 10A to 10C. Therefore, in such a case, the center is decided by performing rectangular approximation.

In addition, it is preferable that the movable unit 200a avoid a projected shape being at a distance away from the rotation center such that the turning trajectory is prevented from increasing and have a shape with rounded corner portions such that it is settled within a smaller turning trajectory.

Based on those above, a flow of phase difference detection related to the present embodiment will be described using the flowchart illustrated in FIG. 11.

When phase difference detection starts (Step S601), if a phase difference can be detected (Yes in Step S602), the imaging apparatus 100 performs focus driving (Step S603) and in-focus determination (Step S604), and then the processing related to phase difference detection ends.

On the other hand, if a phase difference cannot be detected (No in Step S602), the imaging apparatus 100 checks whether an imaging element holding position has moved (Step S605).

As described above, there is a probability that the imaging element holding position may be moved to a position calculated based on lens information such as center position information of the image circle, image circle diameter information, a focal distance, a focal state, and an aperture obtained through communication with the lens; a posture of the imaging apparatus 100; and the like. The imaging apparatus 100 acquires the lens information through communication from the lens mounted in the imaging apparatus 100. The lens information includes any one or a plurality of at least image circle center position information, image circle diameter information, a kind of the lens, a focal distance, a focal state, and an aperture state. If the imaging element holding position has moved (Yes in Step S605), the imaging apparatus 100 causes the movable unit 200a to make parallel movement such that the movement amount thereof is reset (Step S606). That is, the movable unit 200a is moved to a position equivalent to a holding position in a state in which the power supply of the imaging apparatus 100 is turned on and a state in which the lens is not mounted.

If the imaging element holding position is reset (Step S606), the imaging apparatus 100 proceeds to the processing of Step S607.

If the imaging element holding position has not moved (No in Step S605), the imaging apparatus 100 proceeds to the processing of Step S607. In Step S607, the imaging apparatus 100 performs rotation driving of the imaging element 210. In subsequent Step S608, the imaging apparatus 100 detects a phase difference. Subsequently, the imaging apparatus 100 performs focus driving (Step S609) and in-focus determination (Step S610), and then the processing related to phase difference detection ends.

Figure 11:
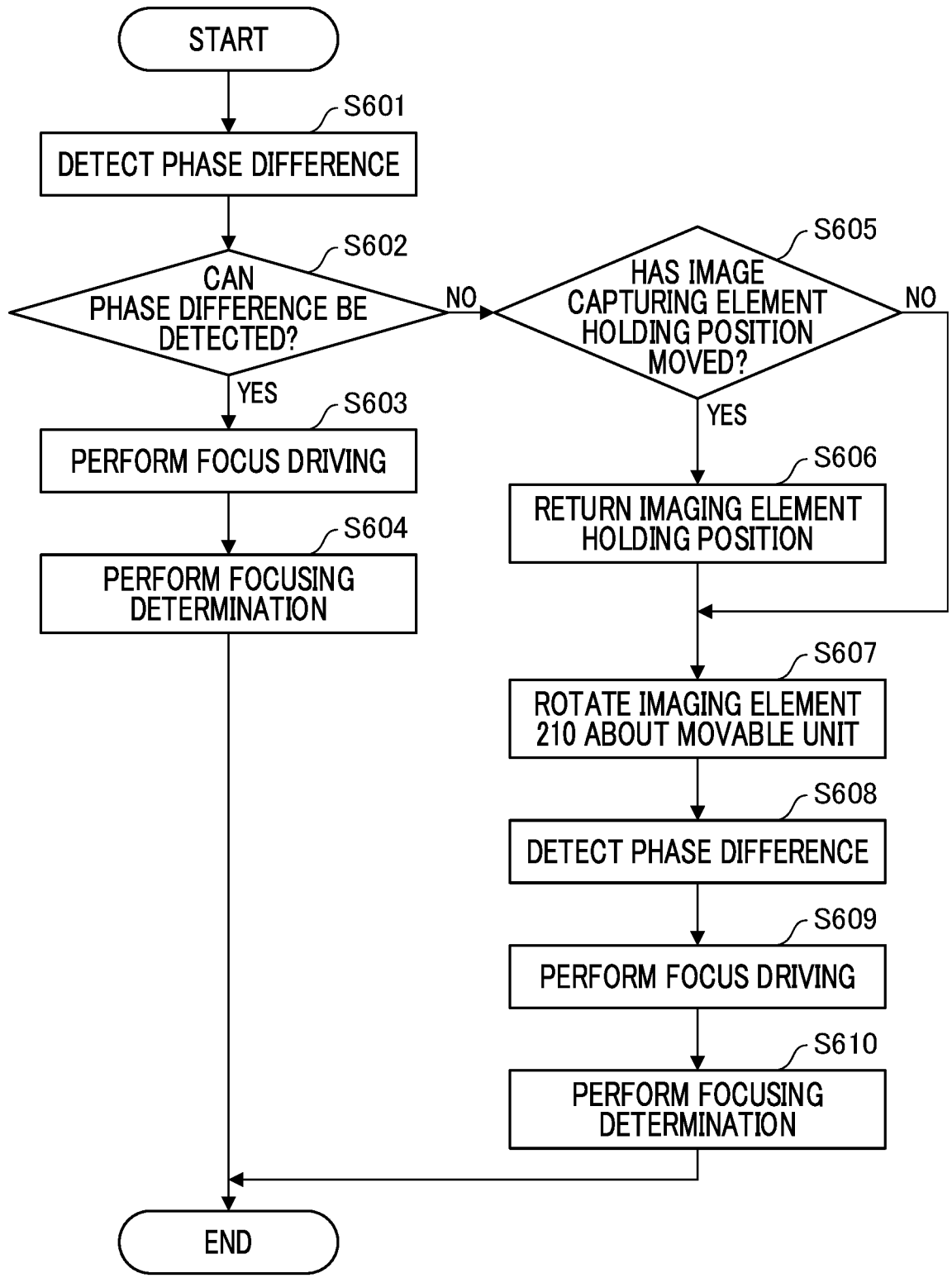
FIG. 11 is a flowchart illustrating a flow of phase difference detection according to the fourth embodiment of the present invention.

Also in the processing of FIG. 11, as in the first embodiment, a phase difference may be detected by performing rotation driving in two stages in the first direction and the second direction. However, it is omitted in the flowchart in FIG. 11.

In addition, if phase difference detection is performed and focus driving is performed, there is a probability that the center position of the image circle may move due to the driving. For this reason, it is preferable that the imaging apparatus 100 perform communication with the lens again, acquire the lens information again, update the imaging element holding position corresponding to the lens state, that is, the imaging apparatus 100 decide the imaging element holding position again and then return to a normal image blur correction state.

According to the fourth embodiment described above, a region in which the movable unit 200a moves can be narrowed to a region required to detect a phase difference, and thus increase in size of the imaging apparatus 100 can be curbed.

Fifth Embodiment

Next, the imaging apparatus according to a fifth embodiment of the present invention will be described. The block diagram of the imaging apparatus of the fifth embodiment is similar to that in FIG. 2, and thus description will be given with reference to FIG. 2.

In the imaging apparatus 100 described in the first embodiment, the rotation center of the movable unit 200a is set within the range of the focus detection region 201. In addition, in the fourth embodiment, it has been mentioned that it is preferable to set the center of the movable unit 200a as the rotation center in order to curb increase in size of the imaging apparatus 100.

Figure 12A:
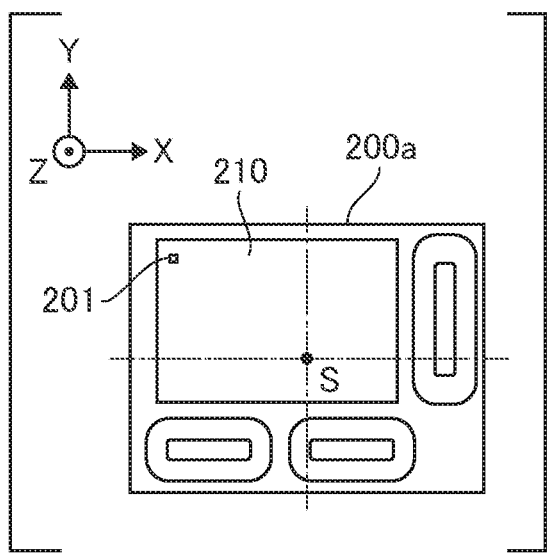
FIGS. 12A to 12C are schematic views illustrating movement of a focus detection region at a time of rotation driving of the imaging element according to a fifth embodiment of the present invention.
Figure 12B:
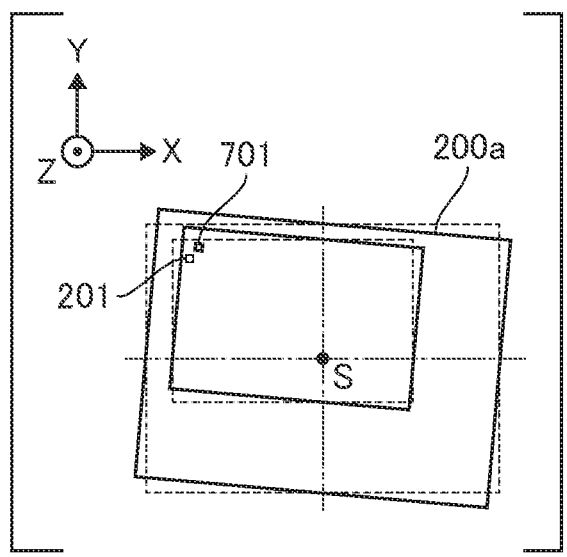
Figure 12C:
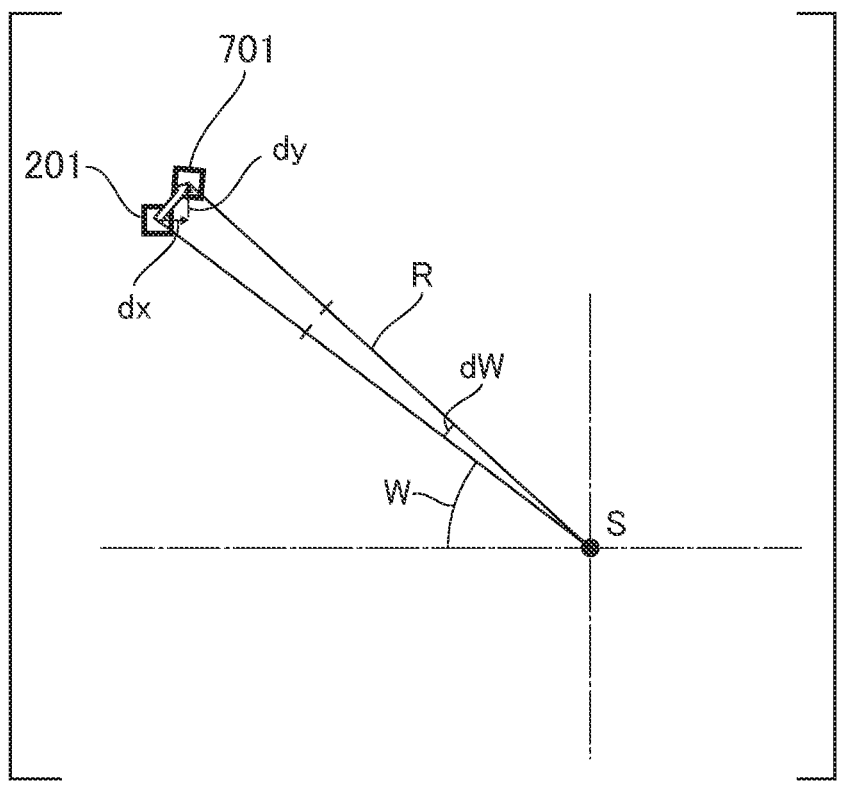

However, if the rotation center is moved to the center of the movable unit 200a or the like as in the fourth embodiment, there is a probability that the focus detection region 201 may deviate from an intended position when rotation driving is performed. FIGS. 12A to 12C are schematic views which are simply illustrated in this regard.

FIG. 12A illustrates a state in which the focus detection region 201 is selected from the focus detectable region of the imaging element 210. At this time, as illustrated in FIG. 12B, if the movable unit 200a is rotated (here, five degrees) around the center S (middle) of the movable unit 200a as the rotation center, the focus detection region 201 deviates from the original position. Here, in order to facilitate the description, the focus detection region 201 after movement will be referred to as a focus detection region 701.

FIG. 12C is a view of the focus detection region 201 and the focus detection region 701 extracted from FIG. 12B. If a distance from the rotation center S to (the center of) the focus detection region 201 is R and an angle to (the center of) the focus detection region 201 is W, movement amounts dx and dy that are movement amounts when it is rotated by dW (here, five degrees) can be expressed by the following Mathematical Expressions 1 and 2.

$$dx = |R \cos W - R \cos(W+dW)| \quad \text{[Math. 1]}$$

$$dy = |R \sin(W+dW) - R \sin W| \quad \text{[Math. 2]}$$

in this manner, if a positional relationship between the rotation center and the selected focus detection region 201 (the distance R and the angle W) and the rotation angle dW are known, the movement amount of the focus detection region 201 can be obtained through calculation. In addition, if the rotation direction of dW with respect to the angle W is known, the moving direction can also be uniquely decided.

The movement amounts dx and dy increase in proportion to the length of the distance R between the rotation center and the focus detection region 201. That is, it is possible to say that when the distance R between the rotation center and the focus detection region 201 increases, the deviation amount from the selected focus detection region 201 increases.

Figure 13A:
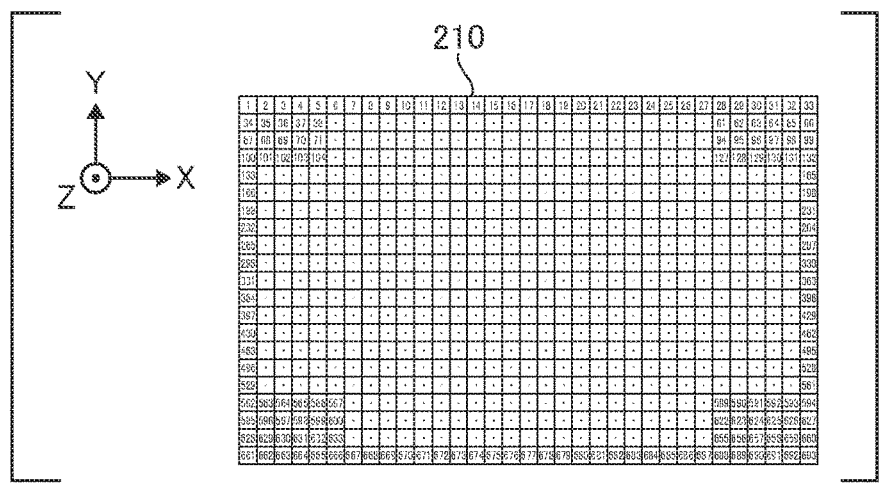
FIGS. 13A to 13C are views specifically illustrating movement of the focus detection region at a time of rotation driving of the imaging element according to the fifth embodiment of the present invention.
Figure 13B:
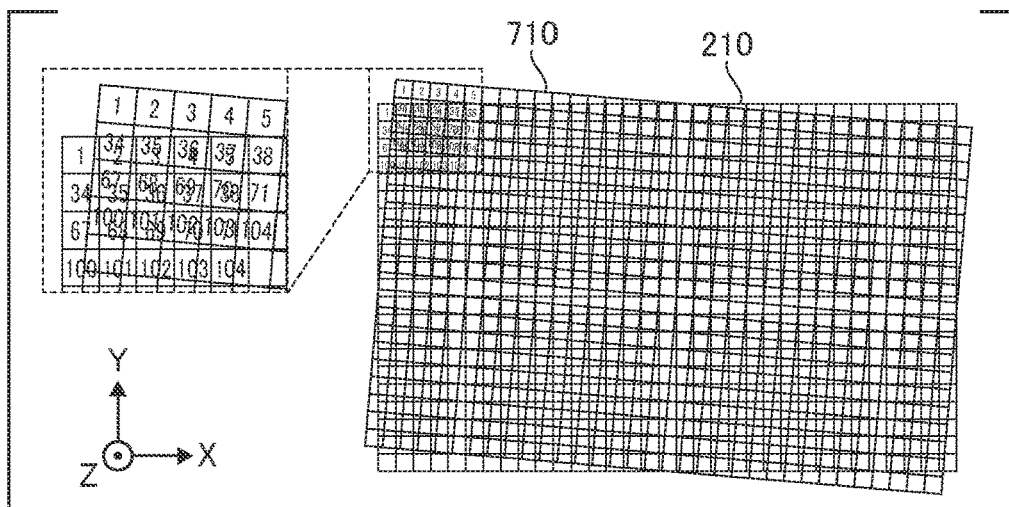
Figure 13C:
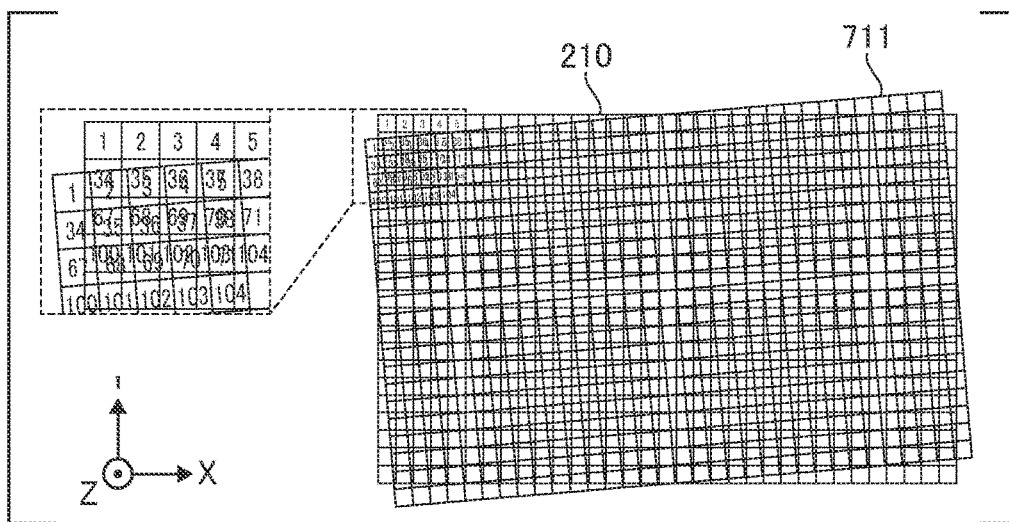

FIGS. 13A to 13C are views more specifically illustrating a phenomenon in which the focus detection region 201 moves.

FIG. 13A is a view of the focus detection regions 201 numbered in order from the upper left on the assumption of a case in which the focus detectable regions are present on the entire surface of the imaging element 210 and it is set to be selectable as the focus detection regions 201 including 693 sections in total with 33 horizontal divisions and 21 vertical divisions. Here, some numerals are omitted for better visibility. However, the focus detection regions 201 are arranged vertically and laterally at equal intervals without a missing part.

FIG. 13B is a view illustrating a state, in which the imaging element 210 is rotated clockwise by five degrees around the center of the imaging element 210 as the rotation center, superimposed on a state before rotation. In this case as well, some numerals are omitted for better visibility. Here, in order to facilitate the description, the imaging element after rotation will be referred to as an imaging element 710.

In the partially enlarged sections in FIG. 13B, for instance, if No. 35 of the imaging element 210 before rotation is selected in the imaging element 710 which is rotated clockwise by five degrees, it can be seen that No. 67 becomes the focus detection region 701 closest to the original No. 35.

FIG. 13C is a view illustrating a state, in which the imaging element 210 is rotated counterclockwise by five degrees around the center of the imaging element 210 as the rotation center, superimposed on the state before rotation. In this case as well, some numerals are omitted for better visibility. Here, in order to facilitate the description, the imaging element after rotation will be referred to as an imaging element 711.

In the partially enlarged sections in FIG. 13C, for instance, if No. 35 of the imaging element 210 before rotation is selected in the imaging element 711 which is rotated clockwise by five degrees, it can be seen that No. 3 becomes the focus detection region 701 closest to the original No. 35.

In this manner, if the focus detection region 201 at a position away from the rotation center is selected, the focus detection region 701 after rotation deviates to a position different from an intended position due to rotation of the imaging element 210. In addition, there is a probability that the focus detection region 701 at a position closest to the original focus detection region 201 may be present at a different selected position (number), and it can be seen that the selected position (number) may also vary depending on the rotation direction.

On the other hand, as illustrated in the partially enlarged sections in FIG. 13C, if any of No. 1 to No. 4 of the imaging element 210 before rotation is selected, even a part of the focus detection region 701 is not present on the imaging element 711 after rotation in a manner of being superimposed thereon. Thus, even when the closest focus detection region 701 is selected on the imaging element 711, deviation at a certain interval occurs in the focus detection region.

In contrast, as illustrated in the partially enlarged sections in FIG. 13B, if any of No. 1 to No. 4 of the imaging element 210 before rotation is selected, the focus detection region 701 is present on the imaging element 710 after rotation in a manner of being superimposed thereon.

From this, it can be seen that a convenient rotation direction of the imaging element 210 is present depending on the position of the selected focus detection region 201.

Based on those above, a flow of phase difference detection related to the present embodiment will be described using the flowchart illustrated in FIG. 14.

When phase difference detection starts (Step S701), if a phase difference can be detected (Yes in Step S702), the imaging apparatus 100 performs focus driving (Step S703) and in-focus determination (Step S704), and then the processing related to phase difference detection ends.

On the other hand, if a phase difference cannot be detected (No in Step S702), the imaging apparatus 100 first decides a convenient rotation direction of the imaging element 210 (Step S705).

A convenient rotation direction can be decided from the selected focus detection region 201, the rotation center, and the rotation angle. It can also be decided from these conditions whenever calculation is performed using the system controller 101. In addition, if the pattern of the rotation center and the rotation angle is set in advance, the selected focus detection region 201 with which a rotation direction is associated may be stored in the internal memory 107.

In addition, particularly, if there is no significant difference between the rotation directions, clockwise rotation is prioritized herein.

Next, the imaging apparatus 100 performs rotation driving of the imaging element 210 (Step S706), resets the selected focus detection region 201 (Step S707), and detects a phase difference (Step S708).

The focus detection region to be reset can be decided based on the selected focus detection region 201, the rotation center, the rotation angle, (and the rotation direction decided based on these). It can also be decided from these conditions whenever calculation is performed using the system controller 101. In addition, if the pattern of the rotation center and the rotation angle is set in advance, the selected focus detection region 201 with which the focus detection region to be reset is associated may be stored in the internal memory 107. At this time, there are also cases in which the focus detection region 201 remains without any change even after resetting depending on a combination of the selected focus detection region 201, the rotation center, and the rotation angle.

The display device 160 and/or the EVF 170 may display displaying corresponding to the focus detection region 201 (for example, displaying of an image captured in the focus detection region 201). If the focus detection region 201 is reset at a different position, the display position of the focus detection region 201 is switched even in the display device 160 and/or the EVF 170 for consistent control. However, in displaying, it is preferable to perform control such that a user of the imaging apparatus 100 does not feel discomfort.

For example, if rotation driving and phase difference detection can be performed within an extremely short period of time, and the processing returns to normal image blur correction operation by immediately returning rotation after focus driving and focusing, there is a probability that displaying of returning by moving the focus detection region 201 may cause a user to feel discomfort.

In such a case, the imaging apparatus 100 may perform control in which although the focus detection region 201 used for phase difference detection processing moves, the focus detection region 201 displayed in the display device 160 and/or the EVF 170 does not move or displaying is temporarily turned off.

Even if the position of the focus detection region 201 reset on the imaging element 210 after rotation driving differs from the position of the focus detection region 201 before rotation driving of the imaging element 210, the display device may not change the displaying corresponding to the focus detection region 201. Rotation driving of the imaging element 210 is not limited to rotation driving and may be parallel movement and/or rotation driving. The display device may be the display device 160 and/or the EVF 170.

After phase difference detection is performed (Step S708), the imaging apparatus 100 performs focus driving (Step S709) and in-focus determination (Step S710), and then the processing related to phase difference detection ends.

In the foregoing description, a case in which the focus detection region 201 deviates from an intended position when the imaging element 210 is subjected to rotation driving has been described as an example. However, it can be handled in accordance with the flowchart in FIG. 14 even if parallel movement of the imaging element 210 is performed.

That is, the imaging apparatus 100 decides a convenient rotation direction in accordance with a direction of parallel movement and a movement amount (Step S705). Next, the imaging apparatus 100 performs rotation driving of the imaging element 210 (Step S706), resets the selected focus detection region 201 (Step S707), and detects a phase difference thereafter (Step S708).

In addition, a case in which parallel movement and/or the rotation driving amount is significant and the focus detection region 701 cannot be reset in the vicinity of an intended position with the imaging element 210 after movement can be considered. In such a case, it is conceivable that a focus detectable region which can be selected by a user depending on the presence or absence of setting of the functions of the present embodiment be limited to a one-size smaller region.

Hereinabove, according to the fifth embodiment, it is possible to curb detecting a phase difference at a position which has deviated from an intended position when parallel movement and/or rotation driving is performed.

Sixth Embodiment

Next, the imaging apparatus according to a sixth embodiment of the present invention will be described. The block diagram of the imaging apparatus of the sixth embodiment is similar to that in FIG. 2, and thus description will be given with reference to FIG. 2.

When a phase difference is detected by performing rotation driving of the imaging element 210 while recording a video image, video image recording is performed in a state in which the angle of view slants during a period of the processing. In addition, when an image before rotation is fixed during the period, a frame rate extremely decreases, and this leads to deterioration of a recording video image. In the present embodiment, these will be handled.

Hereinafter, with reference to the drawings, the sixth embodiment of the present invention will be described.

Figure 15:
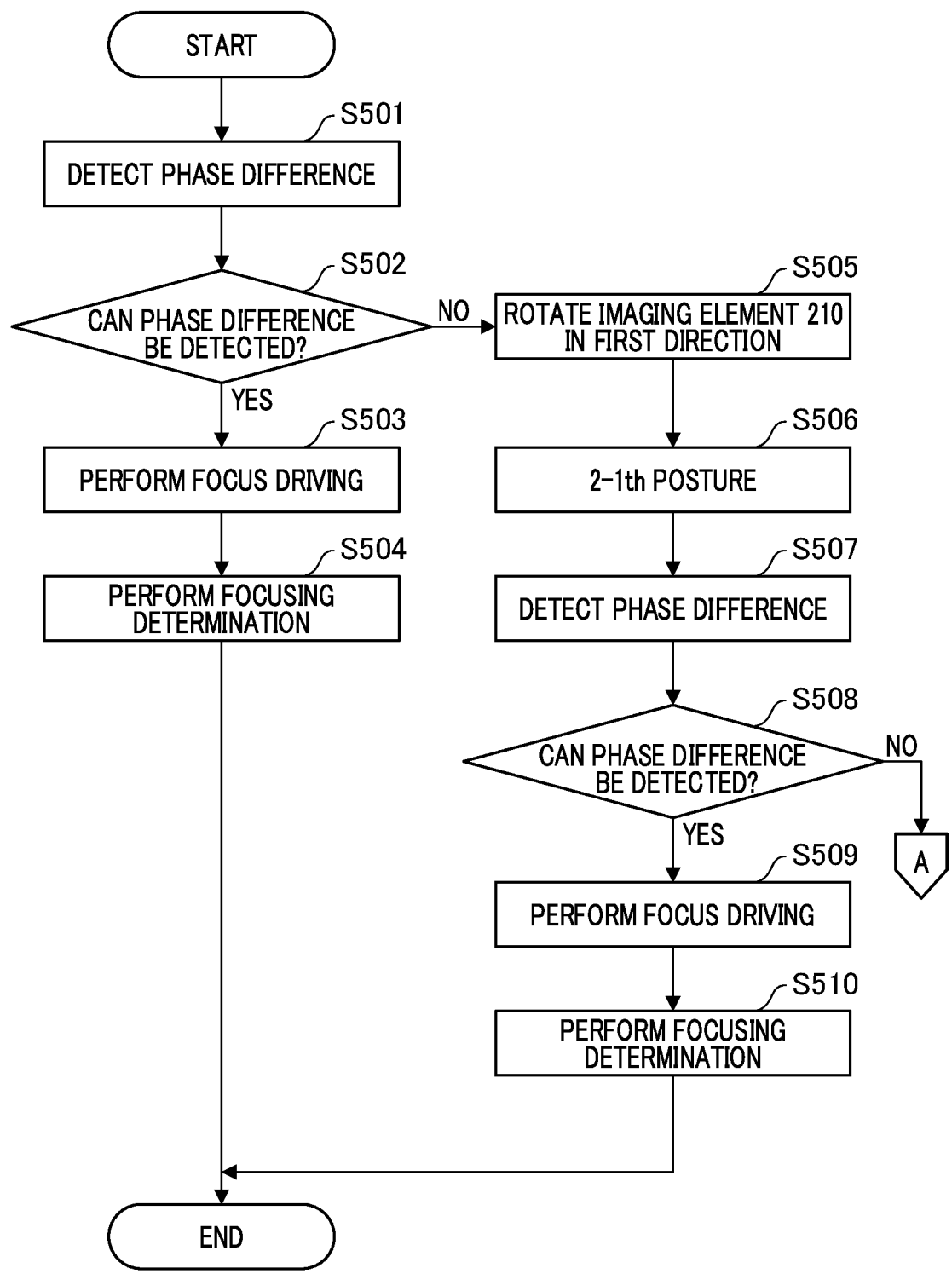
FIG. 15 is a flowchart illustrating a flow of phase difference detection performed through rotation driving of the imaging element while capturing a still image according to a sixth embodiment of the present invention.
Figure 16:
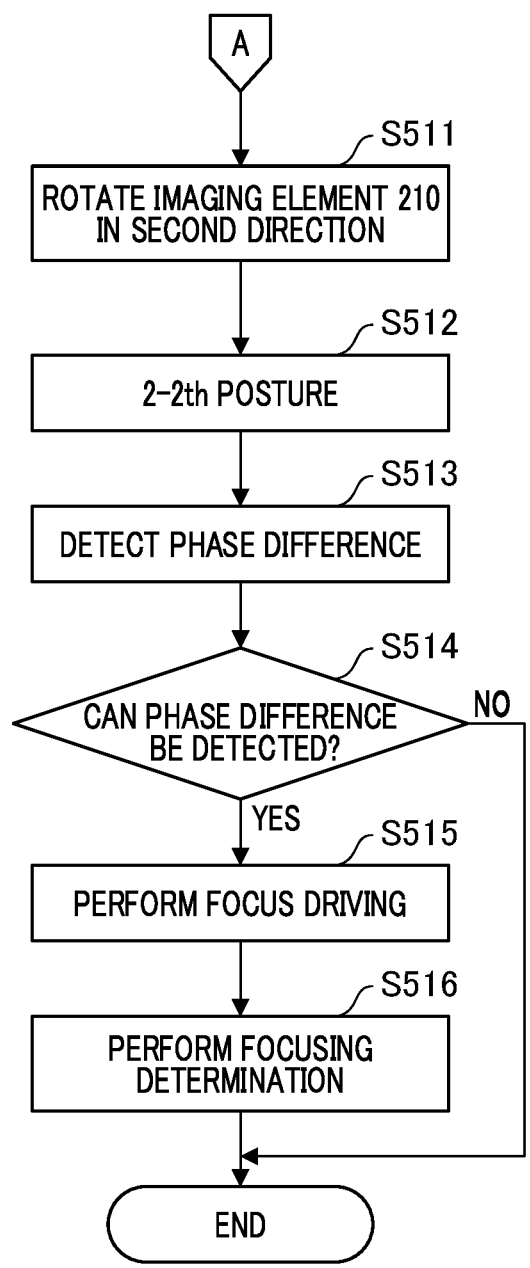
FIG. 16 is a flowchart illustrating another flow of phase difference detection performed through rotation driving of the imaging element while capturing a still image according to the sixth embodiment of the present invention.

FIG. 15 is a flowchart illustrating a flow of phase difference detection performed through rotation driving of the imaging element 210 when a video image is not recorded (at the time of capturing a still image or the like). FIG. 16 is a flowchart illustrating another flow of phase difference detection performed through rotation driving of the imaging element 210 when a video image is not recorded (at the time of capturing a still image or the like). FIG. 16 is a view illustrating processing subsequent to FIG. 15. FIG. 15 illustrates Steps S501 to S510. FIG. 16 illustrates Steps S511 to S516.

The imaging apparatus 100 starts phase difference detection in the first posture (Step S501). At this time, if a phase difference can be detected (Yes in Step S502), the imaging apparatus 100 performs focus driving (Step S503) and in-focus determination (Step S504), and then the processing related to phase difference detection ends.

On the other hand, if a phase difference cannot be detected (No in Step S502), the imaging apparatus 100 performs rotation driving of the imaging element 210 in the first direction (Step S505), and in the 2-1th posture (Step S506), the imaging apparatus 100 detects a phase difference (Step S507).

At this time, if a phase difference can be detected (Yes in Step S508), the imaging apparatus 100 performs focus driving (Step S509) and in-focus determination (Step S510), and then the processing related to phase difference detection ends.

On the other hand, if a phase difference cannot be detected (No in Step S508), the imaging apparatus 100 performs rotation driving of the imaging element 210 in the second direction (Step S511), and in the 2-2th posture (Step S512), the imaging apparatus 100 detects a phase difference (Step S513).

At this time, if a phase difference can be detected (Yes in Step S514), the imaging apparatus 100 performs focus driving (Step S515) and in-focus determination (Step S516), and then the processing related to phase difference detection ends. If a phase difference cannot be detected (No in S514), the imaging apparatus 100 ends the processing related to phase difference detection.

Figure 17:
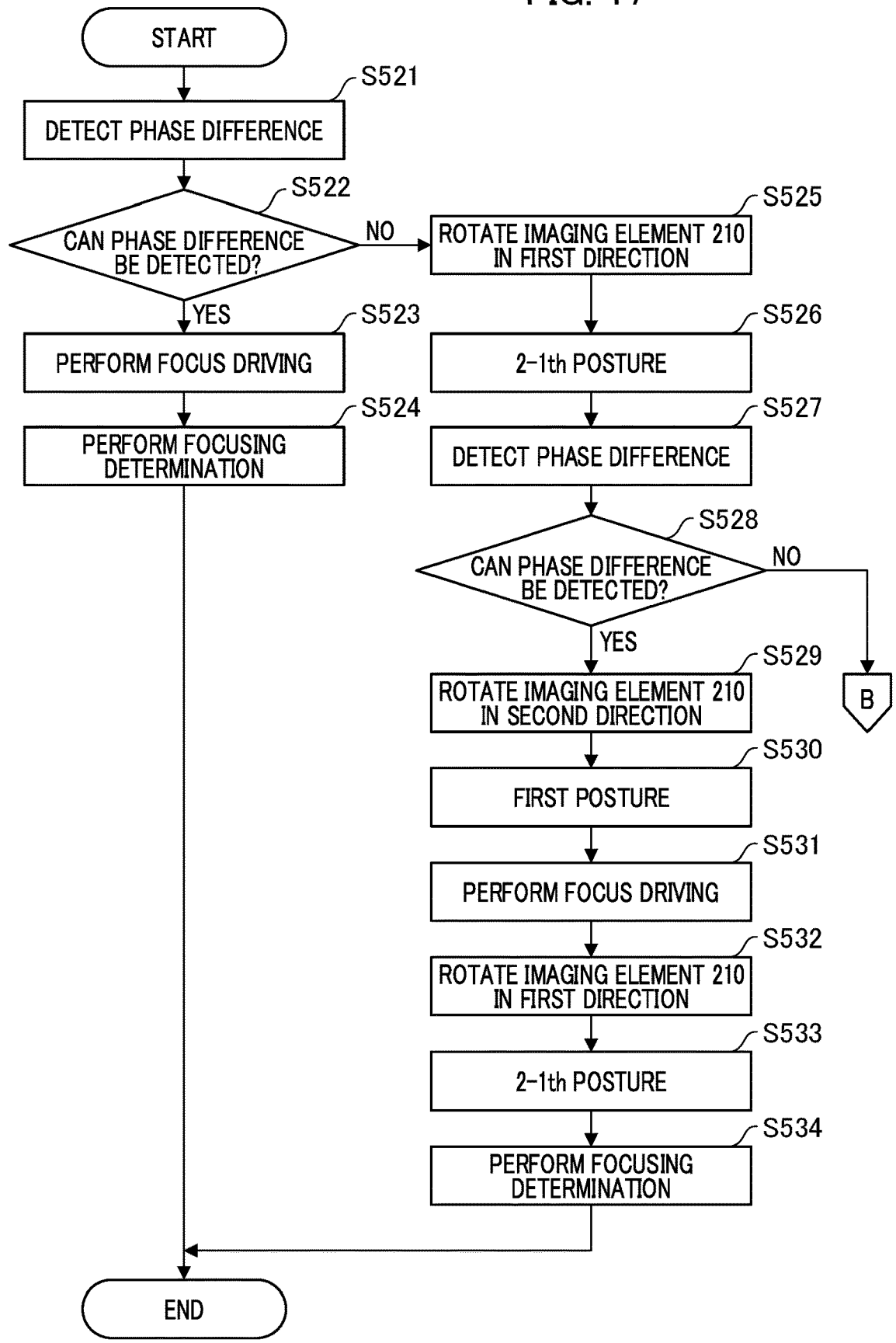
FIG. 17 is a flowchart illustrating a flow of phase difference detection performed through rotation driving of the imaging element while recording a video image according to the sixth embodiment of the present invention.
Figure 18:
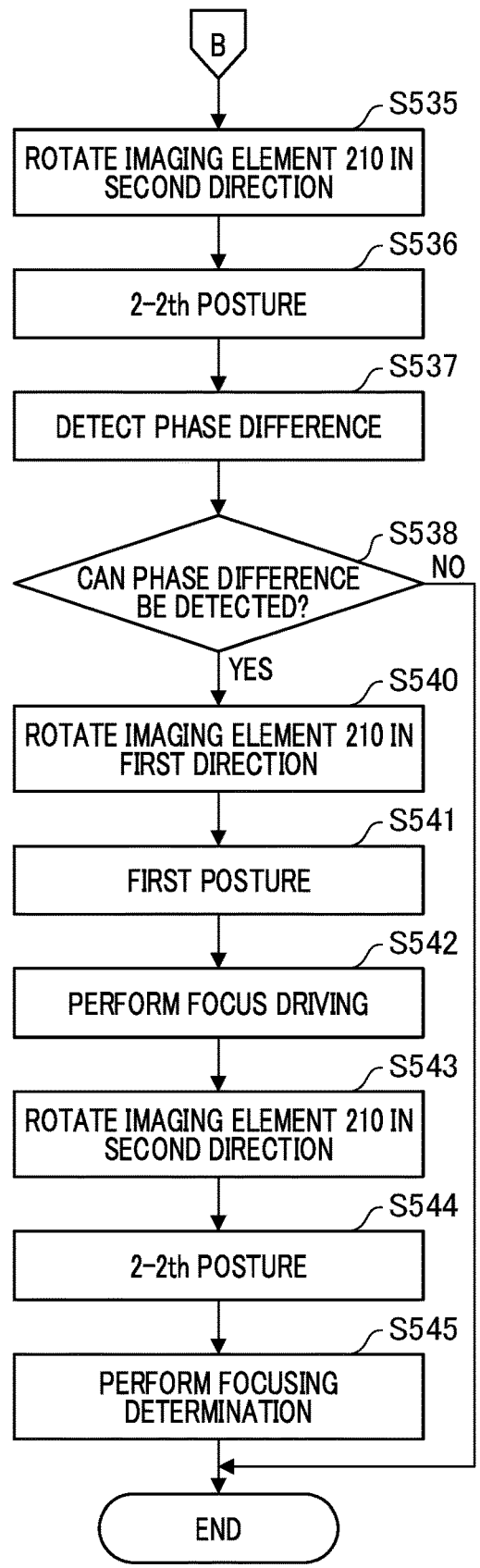
FIG. 18 is a flowchart illustrating another flow of phase difference detection performed through rotation driving of the imaging element while recording a video image according to the sixth embodiment of the present invention.

FIG. 17 is a flowchart illustrating a flow of phase difference detection performed through rotation driving of the imaging element 210 at the time of recording a video image. FIG. 18 is a flowchart illustrating another flow of phase difference detection performed through rotation driving of the imaging element 210 at the time of recording a video image. FIG. 18 is a view illustrating processing subsequent to FIG. 17. FIG. 17 illustrates Steps S521 to S534. FIG. 18 illustrates Steps S535 to S545.

The imaging apparatus 100 starts phase difference detection in the first posture (Step S521). At this time, if a phase difference can be detected (Yes in Step S522), the imaging apparatus 100 performs focus driving (Step S523) and in-focus determination (Step S524), and then the processing related to phase difference detection ends.

On the other hand, if a phase difference cannot be detected (No in Step S522), the imaging apparatus 100 performs rotation driving of the imaging element 210 in the first direction (Step S525), and in the 2-1th posture (Step S526), the imaging apparatus 100 detects a phase difference (Step S527).

At this time, if a phase difference can be detected (Yes in Step S528), the imaging apparatus 100 rotates the imaging element in the second direction (Step S529), and in the first posture (Step S530), the imaging apparatus 100 performs focus driving (Step S531).

Moreover, the imaging apparatus 100 rotates the imaging element 210 in the first direction (Step S532), and in the 2-1th posture (Step S533), the imaging apparatus 100 performs in-focus determination (Step S534). Then, the processing related to phase difference detection ends.

On the other hand, if a phase difference cannot be detected (No in Step S528), the imaging apparatus 100 performs rotation driving of the imaging element 210 in the second direction (Step S535), and in the 2-2th posture (Step S536), the imaging apparatus 100 detects a phase difference (Step S537).

At this time, if a phase difference can be detected (Yes in Step S538), the imaging apparatus 100 rotates the imaging element in the first direction (Step S539), and in the first posture (Step S540), the imaging apparatus 100 performs focus driving (Step S541).

Moreover, the imaging apparatus 100 rotates the imaging element 210 in the second direction (Step S542), and in the 2-2th posture (Step S543), the imaging apparatus 100 performs in-focus determination (Step S544). Then, the processing related to phase difference detection ends.

On the other hand, if a phase difference cannot be detected (No in Step S538), the imaging apparatus 100 ends the processing related to phase difference detection.

When the imaging element 210 is not in the first posture while recording a video image, the imaging apparatus 100 may record this information in the internal memory 107 or the recording medium 108.

As described above, in the present embodiment, while recording a video image, a state in which the imaging element 210 is rotated can be in a short period of time. Therefore, the period of deterioration in recording video image due to deviation of the angle of view of the recording video image can be minimized.

Seventh Embodiment

Next, the imaging apparatus according to a seventh embodiment of the present invention will be described. The block diagram of the imaging apparatus of the seventh embodiment is similar to that in FIG. 2, and thus description will be given with reference to FIG. 2.

In the imaging apparatus 100 described in the first embodiment, if a phase difference cannot be detected, a phase difference can be detected by rotating the imaging element 210.

However, when the imaging element 210 is rotated, there is a probability that a live view image displayed by the display device 160 or the EVF 170 may slant and this may cause discomfort to a user. In the present embodiment, this will be handled.

Using FIGS. 19A to 19E, a method for performing displaying such that a live view image does not slant when the imaging element 210 is rotated will be described. In addition, FIGS. 19A to 19E illustrate an example of a case in which a still image is captured with the horizontal line as a subject.

Figure 19E:
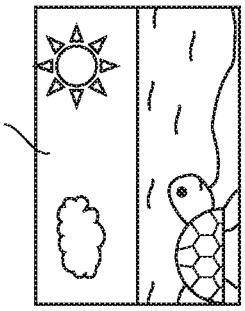
FIGS. 19A to 19E are views describing image processing performed at a time of rotation driving of the imaging element according to a seventh embodiment of the present invention.
Figure 19B:
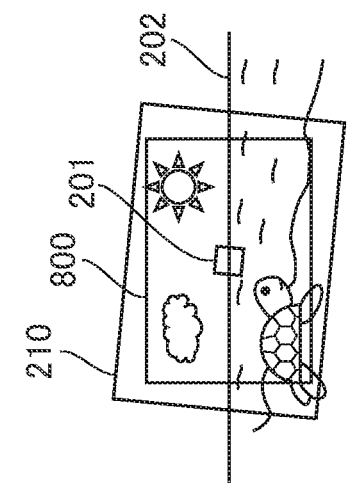
Figure 19D:
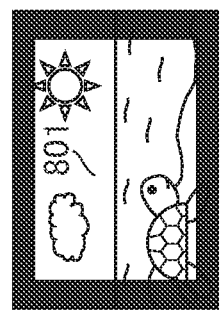
Figure 19A:
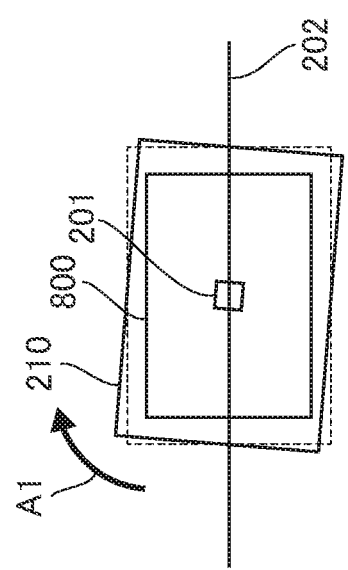

As described above in FIG. 4A, the dotted line part in FIG. 19A indicates a position before the imaging element 210 is driven, and the solid line part indicates a position after driving. If a phase difference cannot be detected when a focus is detected with respect to the subject 202 of a lateral line pattern, the imaging apparatus 100 performs rotation driving of the imaging element 210 in the A1 direction around the focus detection region 201. At this time, the rotation center may be set anywhere as long as it is within the range of the focus detection region 201. In addition, the rotation direction is not limited to the direction in the diagram and may be a direction opposite thereto.

The imaging apparatus 100 sets a crop region 800 in the imaging element 210 when the imaging element 210 is rotated in accordance with the phase difference detection information. At this time, the crop region 800 is provided such that the position does not relatively change with respect to the imaging element 210 before rotation driving, the focus detection region 201 is included, and the crop region 800 has a size so as not to be trimmed at the time of rotation driving of the imaging element 210. This setting is performed by monitoring the position of the imaging element 210 using the image blur correction unit driving control unit 111. Further, an image of the crop region 800 is displayed via a display control unit 161 such that the image does not slant with respect to the display device 160 or the EVF 170. The crop region 800 may be a large region including the focus detection region 201 as illustrated in FIG. 19A or may be a region having approximately the same size as the focus detection region 201.

FIG. 19B illustrates a relationship between the subject 202 and the imaging element 210 in a case in which the horizontal line is adopted as an example of the subject 202.

Figure 19C:
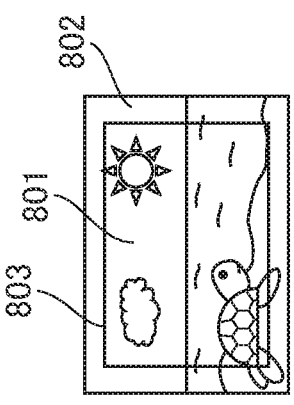

FIG. 19C illustrates first live view displaying in which the image of the crop region 800 illustrated in FIG. 19B is subjected to live view displaying in the display device 160 or the EVF 170.

FIG. 19D illustrates second live view displaying in which the image of the crop region 800 illustrated in FIG. 19B is subjected to live view displaying in the display device 160 or the EVF 170.

FIG. 19E illustrates third live view displaying in which the image of the crop region 800 illustrated in FIG. 19B is subjected to live view displaying in the display device 160 or the EVF 170.

As illustrated in FIG. 19C, the first live view displaying is constituted of an image 801 of the crop region 800 and an image 802 of the imaging element 210 before rotation. In the first live view displaying, the crop region 800 is subjected to live view displaying without any change, and other display regions (other than the crop region) are displayed in a composite manner such that they become the image 802 of the imaging element 210 before rotation. At this time, the image 802 of the imaging element 210 before rotation is a still image. In addition, image processing such as shading processing may be applied to this image 802 of the imaging element 210 before rotation. Further, a frame 803 of the crop region 800 may be displayed at the time of the first live view displaying. Since the image 801 of the crop region 800 and the image 802 of the imaging element 210 before rotation are partitioned through shading processing or by the frame 803, discomfort due to inconsistency of an image at a boundary part can be reduced. Moreover, due to shading processing or the frame 803, it is possible to inform a user of the fact that AF is in operation.

As illustrated in FIG. 19D, in the second live view displaying, the image 801 of the crop region 800 is subjected to live view displaying without any change, and nothing is displayed in other display regions (other than the crop region).

As illustrated in FIG. 19E, in the third live view displaying, the image 801 of the crop region 800 is enlarged and subjected to live view displaying.

The imaging apparatus 100 may display an image of the crop region 800 of the imaging element 210 before rotation in the display device 160 or the EVF 170 during rotation driving of the imaging element 210.

As above, according to the present embodiment, since no slant occurs in a live view image by providing the crop region 800 at the time of rotating the imaging element 210, discomfort to a user can be reduced.

In FIGS. 19A to 19E, a case in which the crop region 800 is provided has been described. However, the imaging apparatus 100 may display only an image before rotation without being provided with the crop region 800 at the time of rotating the imaging element 210. At this time, an image of the imaging element 210 before rotation is a still image and may be displayed after being subjected to image processing such as enlargement, reduction, or shading processing.

In this manner, even if the crop region 800 is not provided at the time of rotating the imaging element 210, since no slant occurs in a live view image by using an image before rotation, discomfort to a user can be reduced.

In addition, in FIGS. 19A to 19E, an example of a case of capturing a still image has been described. However, this method can also be similarly applied at the time of capturing a video image.

Figure 20A:
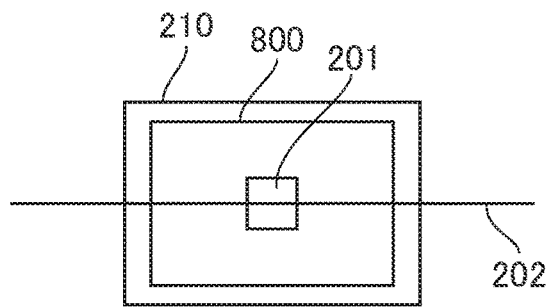
FIGS. 20A to 20D are views describing image processing performed regardless of rotation driving of the imaging element according to the seventh embodiment of the present invention.
Figure 20B:
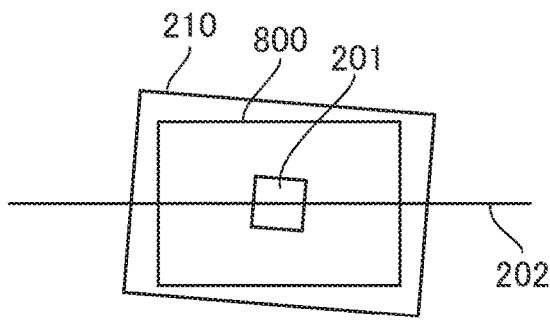

Next, using FIGS. 20A to 20D, in methods for performing displaying with no slant of a live view image, a case of providing a crop region regardless of rotation of the imaging element 210 will be described. FIG. 20A illustrates a state in which the imaging element 210 is not subjected to rotation driving. In addition, FIG. 20B illustrates a state in which the imaging element 210 is subjected to rotation driving around the focus detection region 201.

Description will be given with reference to FIGS. 20A and 20B. If setting in which the imaging element 210 can be subjected to rotation driving in accordance with the phase difference detection information and a focus can be detected (first setting) is selected, the imaging apparatus 100 provides the crop region 800 at all times regardless of the rotation state of the imaging element 210.

At this time, the crop region 800 is set such that the position does not relatively change with respect to the imaging element 210 before rotation driving, the focus detection region 201 is included, and the crop region 800 has a size so as not to be trimmed at the time of rotation driving of the imaging element 210. This setting is performed by monitoring the position of the imaging element 210 using the image blur correction unit driving control unit 111. Further, an image of the crop region 800 is enlarged and subjected to live view displaying. In addition, an image of the crop region 800 is displayed via the display control unit 161 such that the image does not slant with respect to the display device 160 or the EVF 170.

Figure 20C:
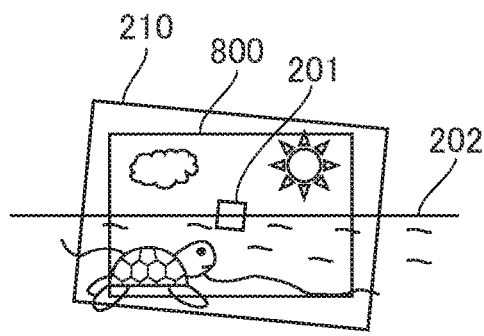
Figure 20D:
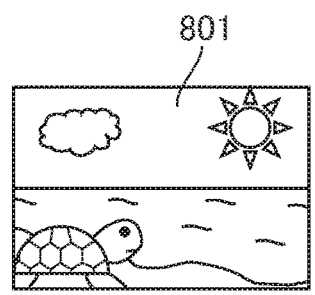

As illustrated in FIGS. 20C and 20D, a case in which a still image is captured with the horizontal line as a subject is adopted as an example. FIG. 20C illustrates a relationship between the subject 202 and the imaging element 210. When the first setting is selected, as illustrated in FIG. 20D, the imaging apparatus 100 enlarges the image 801 of the crop region 800 and performs live view displaying.

According to the present embodiment, in this manner, since no slant occurs in a live view image by providing the crop region 800 and enlarging and displaying an image at all times, discomfort to a user can be reduced.

In addition, in FIGS. 20A to 20D, an example of a case of capturing a still image has been described. However, this method can also be similarly applied at the time of capturing a video image.

Hereinabove, preferable embodiments of the present invention have been described. However, the present invention is not limited to these embodiment and various modifications and changes can be made within a range of the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-024111, filed Feb. 17, 2020, which is hereby incorporated by reference wherein in its entirety.

What is claimed is:
1. An imaging apparatus comprising:
an imaging element that captures an image for detecting a phase difference in a predetermined direction on an image surface in order to detect a focal state of an image formed by an image formation lens;
an imaging element driving unit configured to be able to drive the imaging element in a parallel movement direction and a rotation direction within a plane perpendicular to an optical axis of the image formation lens; and at least one processor and memory holding a program which makes the processor function as:
- a control unit configured to rotate the imaging element by the imaging element driving unit in accordance with a result of an image captured by the imaging element; and
- a focus detection unit configured to detect a focus with the imaging element rotated by the control unit in accordance with a signal output by the imaging element.

2. The imaging apparatus according to claim 1,
wherein the focus detection unit
- detects a phase difference with the imaging element rotated in a first direction if a phase difference is not able to be detected, and
- further detects a phase difference with the imaging element rotated in a second direction that is a direction opposite to the first direction if a phase difference is not able to be detected.

3. The imaging apparatus according to claim 1,
wherein the processor further functions as a posture detection unit configured to detect a posture of the imaging apparatus, and
wherein the control unit controls driving of the imaging element driving unit in accordance with an output of the posture detection unit.

4. The imaging apparatus according to claim 1,
wherein the processor further functions as a contrast detection unit configured to detect a contrast within a focus detection region, and
wherein the focus detection unit does not rotate the imaging element if a value detected by the contrast detection unit is a contrast unsuitable for detecting a phase difference in a case in which a phase difference is not able to be detected.

5. The imaging apparatus according to claim 1,
wherein the processor further functions as a pattern detection unit configured to detect a pattern within a focus detection region, and
wherein, the focus detection unit does not rotate the imaging element if a pattern detected by the pattern detection unit is a pattern suitable for detecting a phase difference in a case in which a phase difference is not able to be detected.

6. The imaging apparatus according to claim 5,
wherein a pattern detected by the pattern detection unit indicates an angle formed by a subject of phase difference detection with respect to an arrangement direction of adjacent phase difference detection pixels included in the imaging element, and
wherein a pattern suitable for detecting a phase difference indicates an angle suitable for detecting a phase difference.

7. The imaging apparatus according to claim 1,
wherein the processor further functions as:
- an image processing unit configured to perform predetermined image processing on an image that is the result of the image captured by the imaging element, and
- a display unit configured to cause a display device to display an image subjected to predetermined image processing by the image processing unit during rotation driving of the imaging element in accordance with the result of the image captured by the imaging element.

8. The imaging apparatus according to claim 7,
wherein the display unit causes an image displayed by the display device before rotation driving of the imaging element to be displayed during rotation driving of the imaging element.

9. The imaging apparatus according to claim 7,
wherein the image processing unit sets a crop region including a focus detection region in the imaging element without relatively changing a position with respect to the imaging element before rotation driving, and
wherein the display unit causes an image in the crop region to be displayed such that the image does not slant with respect to the display device.

10. The imaging apparatus according to claim 1,
wherein the imaging element is integrally formed in a movable unit,
wherein the imaging element driving unit is able to move a position of the imaging element to a first imaging element holding position that is a position of the imaging element in a state in which a lens is not mounted in a mount and a second imaging element holding position that is a position of the imaging element decided in accordance with lens information acquired from a lens mounted in the mount, and
wherein the imaging element driving unit performs control to make parallel movement from the second imaging element holding position to the first imaging element holding position and/or to perform rotation driving around a center of the movable unit when a phase difference is detected with the rotated imaging element.

11. The imaging apparatus according to claim 10,
wherein the focus detection unit decides the second imaging element holding position using posture information of the imaging apparatus in addition to the lens information.

12. The imaging apparatus according to claim 10,
wherein after detecting a phase difference with the rotated imaging element, the focus detection unit acquires the lens information of a mounted lens again and decides the second imaging element holding position again.

13. The imaging apparatus according to claim 1,
wherein the focus detection unit resets a position of a focus detection region selected before driving using the imaging element after driving and detects a phase difference when a phase difference is detected by performing parallel movement and/or rotation driving of the imaging element by the imaging element driving unit.

14. The imaging apparatus according to claim 13,
wherein the focus detection unit decides a direction in which the imaging element is rotatively driven by the imaging element driving unit in accordance with a position of a focus detection region selected before parallel movement and/or rotation driving of the imaging element.

15. The imaging apparatus according to claim 13 further comprising:
a display device that performs displaying corresponding to a focus detection region,
wherein the display device does not change displaying corresponding to a focus detection region even if a position of a focus detection region reset by the imaging element after parallel movement and/or rotation driving differs from a position of a focus detection region before parallel movement and/or rotation driving of the imaging element.

16. The imaging apparatus according to claim 1 further comprising:
a focus driving unit;
wherein the processor further functions as a in-focus determination unit,
wherein the imaging apparatus has a first mode for capturing a still image, and a second mode for recording a video image,
wherein the imaging element is able to be driven between a first posture for recording a video image and a second posture for detecting a focus with the rotated imaging element, and
wherein in the second mode, a phase difference is detected in the second posture, focus driving is performed thereafter in the first posture, and in-focus determination is performed in the second posture.

17. The imaging apparatus according to claim 16,
wherein in the first mode, a phase difference is detected in the second posture, and focus driving and in-focus determination are performed thereafter while remaining in the second posture.

18. The imaging apparatus according to claim 1,
the processor further function as:
a determining unit configured to determine whether or not detecting a focus by the phase difference detection is possible using the signal output by the imaging element;
wherein the control unit rotates the imaging element; and
wherein the focus detection unit detects a focus based on a signal output by the imaging element rotating by the control unit.

19. The imaging apparatus according to claim 1,
wherein the control unit does not rotate the imaging element according to the imaging result when the determining unit determined that the detecting a focus is possible.

20. A method for controlling an imaging apparatus including an imaging element that captures an image for detecting a phase difference in a predetermined direction on an image surface in order to detect a focal state of an image formed by an image formation lens, and an imaging element driving unit configured to be able to drive the imaging element in a parallel movement direction and a rotation direction within a plane perpendicular to an optical axis of the image formation lens, the method comprising:
rotating the imaging element by the imaging element driving unit in accordance with a result of an image captured by the imaging element; and
detecting a focus with the imaging element rotated by the control unit in accordance with a signal output by the imaging element.

21. The imaging apparatus according to claim 19,
wherein the control unit rotates the imaging element according to the posture information when the control unit does not rotate the imaging element according to the imaging result.

* * * * *